(12) United States Patent
Moroo et al.

(10) Patent No.: US 7,280,701 B2
(45) Date of Patent: Oct. 9, 2007

(54) IMAGE DATA PROCESSING APPARATUS, IMAGE DATA PROCESSING METHOD, AND COMPUTER READABLE MEDIUM

(75) Inventors: Jun Moroo, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 719 days.

(21) Appl. No.: 10/824,528

(22) Filed: Apr. 15, 2004

(65) Prior Publication Data

US 2004/0234139 A1 Nov. 25, 2004

(30) Foreign Application Priority Data

May 20, 2003 (JP) ............................. 2003-142582

(51) Int. Cl.
*G06K 9/36* (2006.01)

(52) U.S. Cl. ..................................... 382/239

(58) Field of Classification Search ................ 382/100, 382/232, 239; 358/3.28; 380/201–203, 380/231–234, 287; 348/460; 370/527–529; 705/44; 713/176
See application file for complete search history.

(56) References Cited

U.S. PATENT DOCUMENTS

| | | |
|---|---|---|
| 5,636,292 A | 6/1997 | Rhoads |
| 5,841,978 A | 11/1998 | Rhoads |
| 6,522,766 B1 | 2/2003 | Ratnakar |
| 6,600,828 B1 | 7/2003 | Kawamura |
| 6,898,297 B2 | 5/2005 | Katsura et al. |
| 2003/0021442 A1 | 1/2003 | Suzaki |
| 2003/0063319 A1 | 4/2003 | Umeda et al. |
| 2004/0120546 A1 | 6/2004 | Yoshiura et al. |

FOREIGN PATENT DOCUMENTS

| | | |
|---|---|---|
| JP | 11-205577 | 7/1999 |
| JP | 2000-50057 | 2/2000 |
| JP | 2000-059743 | 2/2000 |
| JP | 2000-216983 | 8/2000 |
| JP | 2000-228720 | 8/2000 |
| JP | 2000-299779 | 10/2000 |
| JP | 2001-103284 | 4/2001 |
| JP | 2002-10058 | 1/2002 |
| JP | 2002-135736 | 5/2002 |

(Continued)

OTHER PUBLICATIONS

Wolfgang Funk, "Image Watermarking in the Fourier Domain based on global features of concentric ring areas", Proceedings of the SPIE vol. 4675, pp. 596-599, (2002).

(Continued)

*Primary Examiner*—Jose L. Couso
(74) *Attorney, Agent, or Firm*—Staas & Halsey LLP

(57) ABSTRACT

To reduce the processing required to embed a code into image data and decode the code. The present invention includes a block dividing section 101 that divides original image data 10 into a plurality of blocks (M×N); an averaging section 103 that extracts each average density (characteristic amount) in a plurality of blocks; and an encoding section 106 that embeds a code C (a plurality of bits) into a plurality of blocks by relating one code (one bit out of the code C) to each pair of blocks mutually located in near position in the plurality of blocks based on a magnitude relation of the average density.

34 Claims, 20 Drawing Sheets

FOREIGN PATENT DOCUMENTS

| JP | 2003-101762 | 4/2003 |
|----|-------------|--------|
| JP | 2003-110846 | 4/2003 |
| JP | 3784825     | 3/2006 |

OTHER PUBLICATIONS

Ching-Tang Hsieh et al., "A Study of Enhancing the Robustness of Watermark", Dept of Electrical Engineering Tamkang University Taipei, Hsien, Taiwan, pp. 325-327 (Dec. 11, 2000).

W. Wesley Peterson et al., "Bose-Chaudhuri-Hocquenghem Codes", pp. 269-309 (1988).

European Search Report dated Feb. 24, 2006.

Seiji Kobayashi, et al., "Data Hiding using Nature of Neighboring Pixels-Statistical Nature of Neighboring Pixels," Information Processing Society of Japan 56th Annual Conference (First Half of 1998), vol. 3-37 to 3-38 (2 pages), including English translation thereof 6 pages).

Notification of Reason(s) for Refusal issued by the Japanese Patent Office on Dec. 13, 2005 in Japanese patent application No. 2005-276561 (Japan patent No. 378425, which is a Japanese divisional application of Japanese application No. 2003-142582 from which the present above-identified US patent application claims priority, 3 pages, including English translation thereof (4 pages).

Notification of Reason(s) for Refusal issued by the Japanese Patent Office on Dec. 13, 2005 in Japanese patent application No. 2003-142582 (Japan patent No. 3784781) from which the present above-identified US patent application claims priority, 3 pages, including English translation thereof (4 pages).

Decision to Grant a Patent for Japanese patent application No. 2003-142582 (Japan patent No. 3784781) from which the present above-identified US patent application claims priority, dated Mar. 14, 2006, 1 page, including English language translation thereof (1 page).

Shuichi Shimizu et al., "Still Picture Data Hiding By Pixel Block", IMB Japan Ltd., Tokyo Research Laboratory, Information Society of Japan, 1966, pp. 2-257 and 2-258, English translation pp. 1-6.

Kineo Matsui, "Basics of Digital Watermark", Morikita Shuppan, K. K., Aug. 1998 pp. 94-97, English translation pp. 1-5.

Japanese Office Action dated Dec. 13, 2005 in Patent Application No. 2003-142582.

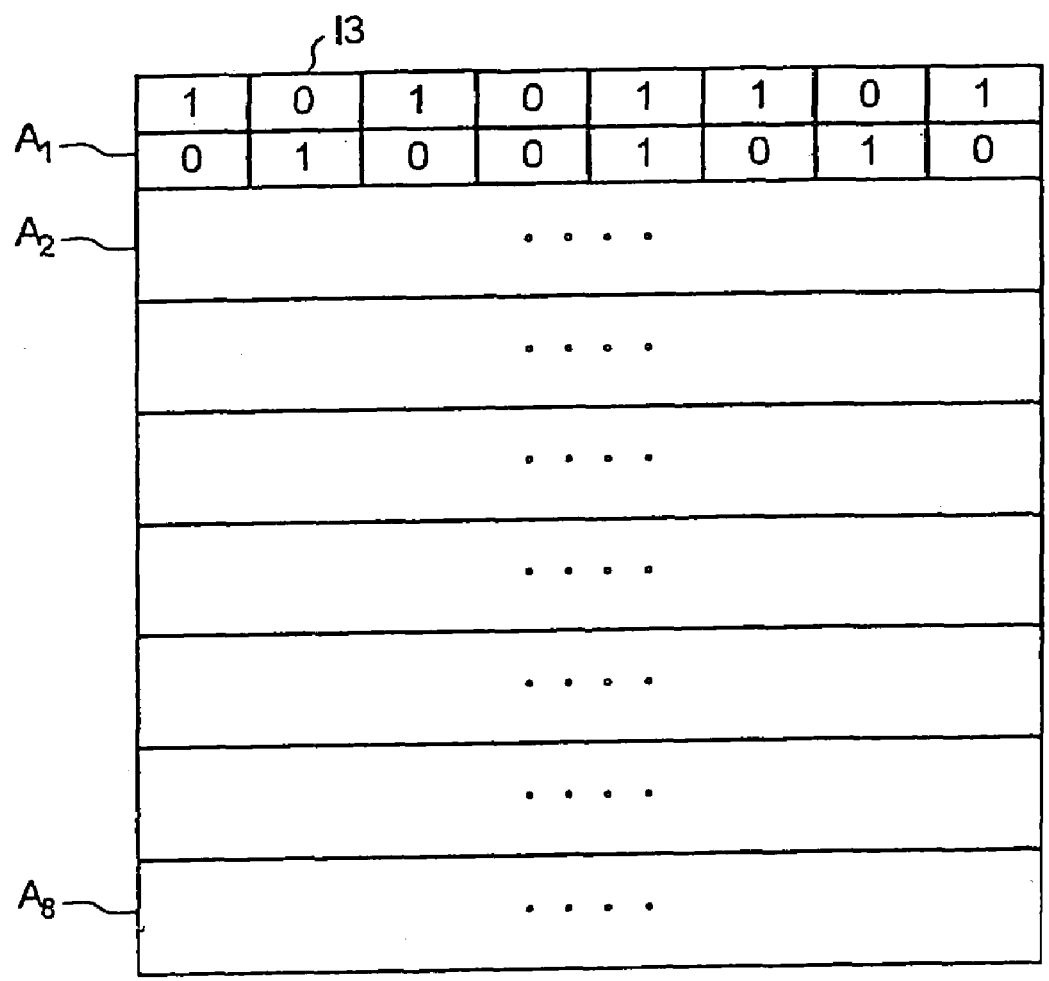

FIG.7

(A) WHEN Dl < Dr $$D'l = (Dl+Dr)/2 - T/2 \quad \cdots (1)$$
$$D'r = (Dl+Dr)/2 + T/2 \quad \cdots (2)$$

(B) WHEN Dl ≧ Dr $$D'l = (Dl+Dr)/2 + T/2 \quad \cdots (3)$$
$$D'r = (Dl+Dr)/2 - T/2 \quad \cdots (4)$$

D'l LEFT-SIDE AVERAGE DENSITY DATA AFTER THE CHANGE
D'r RIGHT-SIDE AVERAGE DENSITY DATA AFTER THE CHANGE
Dl LEFT-SIDE AVERAGE DENSITY DATA BEFORE THE CHANGE
Dr RIGHT-SIDE AVERAGE DENSITY DATA BEFORE THE CHANGE
T DIFFERENCE ATTACHED TO EACH BLOCK

FIG. 10
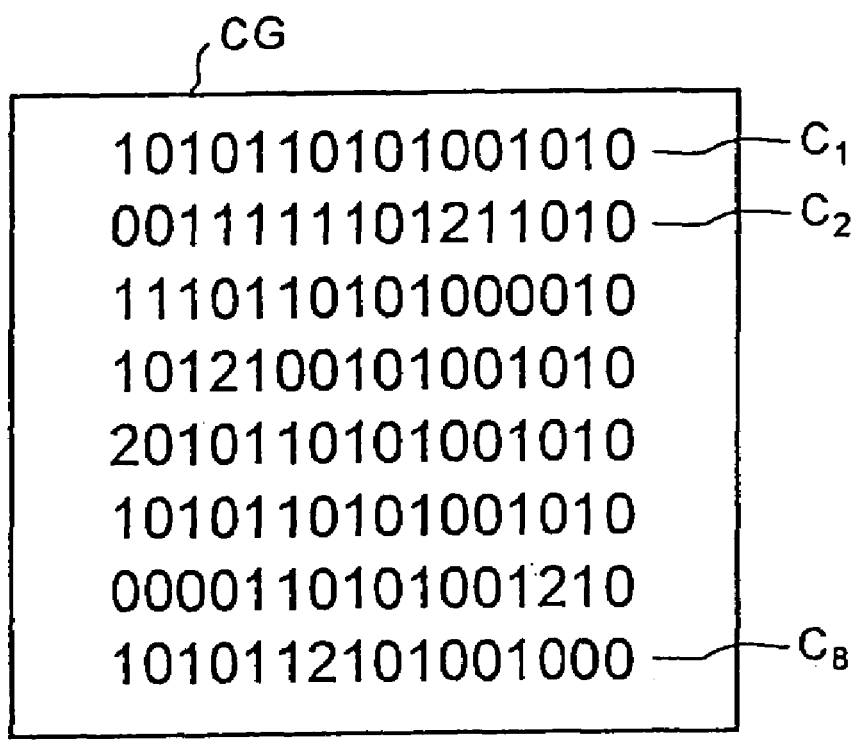
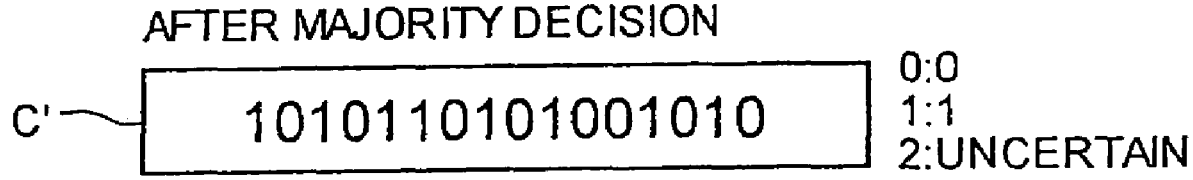

IMAGE DATA PROCESSING APPARATUS, IMAGE DATA PROCESSING METHOD, AND COMPUTER READABLE MEDIUM

CROSS-REFERENCE TO RELATED APPLICATIONS

This application is related to and claims the benefit of Japanese Application No. 2003-142582 filed May 20, 2003 in the Japanese Patent Office, the contents of which are incorporated herein by reference.

BACKGROUND OF THE INVENTION

1. Field of the Invention

The present invention relates to an image data processing apparatus, an image data processing method, and an image data processing program that are can be suitably used in, for example, encoders or decoders. Particularly, the present invention relates to an image data processing apparatus, an image data processing method, and an image data processing program that can reduce the processing required to embed a code into image data or decode the code.

2. Description of the Related Art

U.S. Pat. No. 5,636,292 and Japanese Patent Application Laid-Open No. 2000-299779 disclose embedding of separate data (such as a code) into image data or audio data to prevent falsifications, prevent an illicit use, and provide additional services.

As the technique is applied for a security purpose, conventional methods are designed to be able to bear a deformation of original data or a request for a partial use. For example, a very complex method (such as a digital watermark) is conventionally employed such as a spread disposition of the same data within an image or inputting data in a frequency region using a Fast Fourier Transformation (FFT).

The digital watermark technique is applied to various additional services. For example, U.S. Pat. No. 5,841,978 discloses a method of reading a digital watermark embedded into a printed material, and displaying a specific web page.

In the conventional technique of embedding a digital watermark, it is necessary to calculate the FFT. However, it requires a huge number of calculations to be performed to calculate the FFT.

It is practically difficult to embed or read data into or from the image data in portable information devices (portable telephone, PHS (Personal Handy phone System), PDAs (Personal Digital Assistant) and the like because these devices have limited resources such as less memory capacity or slower processors.

These together with other aspects and advantages which will be subsequently apparent, reside in the details of construction and operation as more fully hereinafter described and claimed, reference being had to the accompanying drawings forming a part hereof, wherein like numerals refer to like parts throughout.

SUMMARY OF THE INVENTION

The present invention has been achieved in order to solve the above problems. It is an aspect of the present invention to provide an image data processing apparatus, an image data processing method, and a computer readable medium that can reduce the processing required to embed a code into image data or decode the code.

To achieve the above mentioned aspect, the present invention includes an image data processing apparatus comprising a dividing unit that divides image data into a plurality of blocks, a characteristic amount extracting unit that extracts a characteristic amount from each of the blocks, and an encoding unit that embeds a plurality of codes based on a magnitude relation of the characteristic amount between each pair of blocks in the blocks.

Moreover, the present invention includes an image data processing method comprising dividing image data into a plurality of blocks, extracting a characteristic amount from each of the blocks, and embedding a plurality of codes based on a magnitude relation of the characteristic amount between each pair of blocks in the blocks.

Moreover, the present invention includes a computer-readable medium storing a program which, when executed by a computer, causes the computer to perform operations comprising dividing image data into a plurality of blocks extracting a characteristic amount from each of the blocks, and embedding a plurality of based on a magnitude relation of the characteristic amount between each pair of blocks in the blocks.

According to the present invention, one code is related to each pair of blocks in a plurality of blocks as a result of dividing image data, based on a magnitude relation of characteristic amount, and a plurality of codes are embedded into a plurality of blocks. Therefore, the necessity to calculate the FFT is eliminated by the present invention, and the processing required to embed the code into the image data is reduced by the present invention.

Moreover, the present invention includes an image data processing apparatus comprising a dividing unit that divides image data into a plurality of blocks, an error-correction-coding code generating unit that encodes a code using an error correction coding to generate an error-correction-coding code, a characteristic amount extracting unit that extracts a characteristic amount from each of the blocks, and an encoding unit that embeds a plurality of error-correction-coding codes based on a magnitude relation of the characteristic amount between each pair of blocks in the blocks.

According to the present invention, as a plurality of error-correction-coding codes are embedded into a plurality of blocks, there is an effect that the decoding side can correct an error, and reliability is increased.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an example of a code C.

FIG. 5 is an example of image coded data I3.

FIG. 7 explains about a density change processing of the encoder 100.

FIG. 10 explains about the majority decision processing by the decoder 200.

DETAILED DESCRIPTION OF THE PREFERRED EMBODIMENTS

An image data processing apparatus, an image data processing method, and an image data processing program according to first to fifth embodiments of the present invention are explained in detail below with reference to drawings.

First Embodiment

An image data processing apparatus according to a first embodiment of the present invention relates to an encoder 100 (refer to FIG. 1) that embeds a (binary) code as separate data into original image data, and a decoder 200 (refer to FIG. 9) that reads the code from the image coded data.

Figure 1:
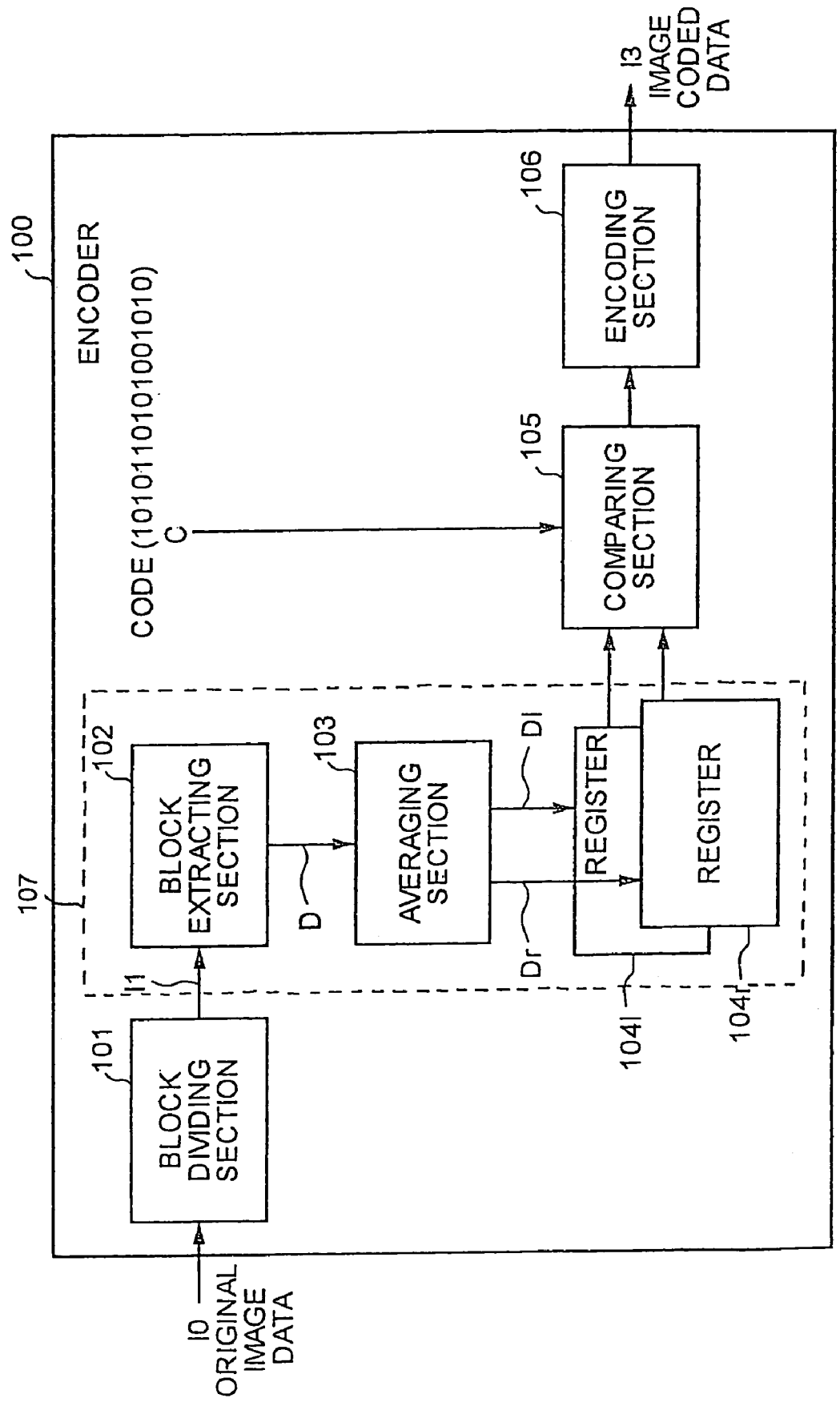
FIG. 1 is a block diagram of the encoder 100 according to the first embodiment of the present invention.

FIG. 1 is a block diagram of the encoder 100. The encoder 100 embeds a code C (refer to FIG. 4) eight times, for example, into original image data I0, and generates image coded data I3 (refer to FIG. 5).

Figure 2:
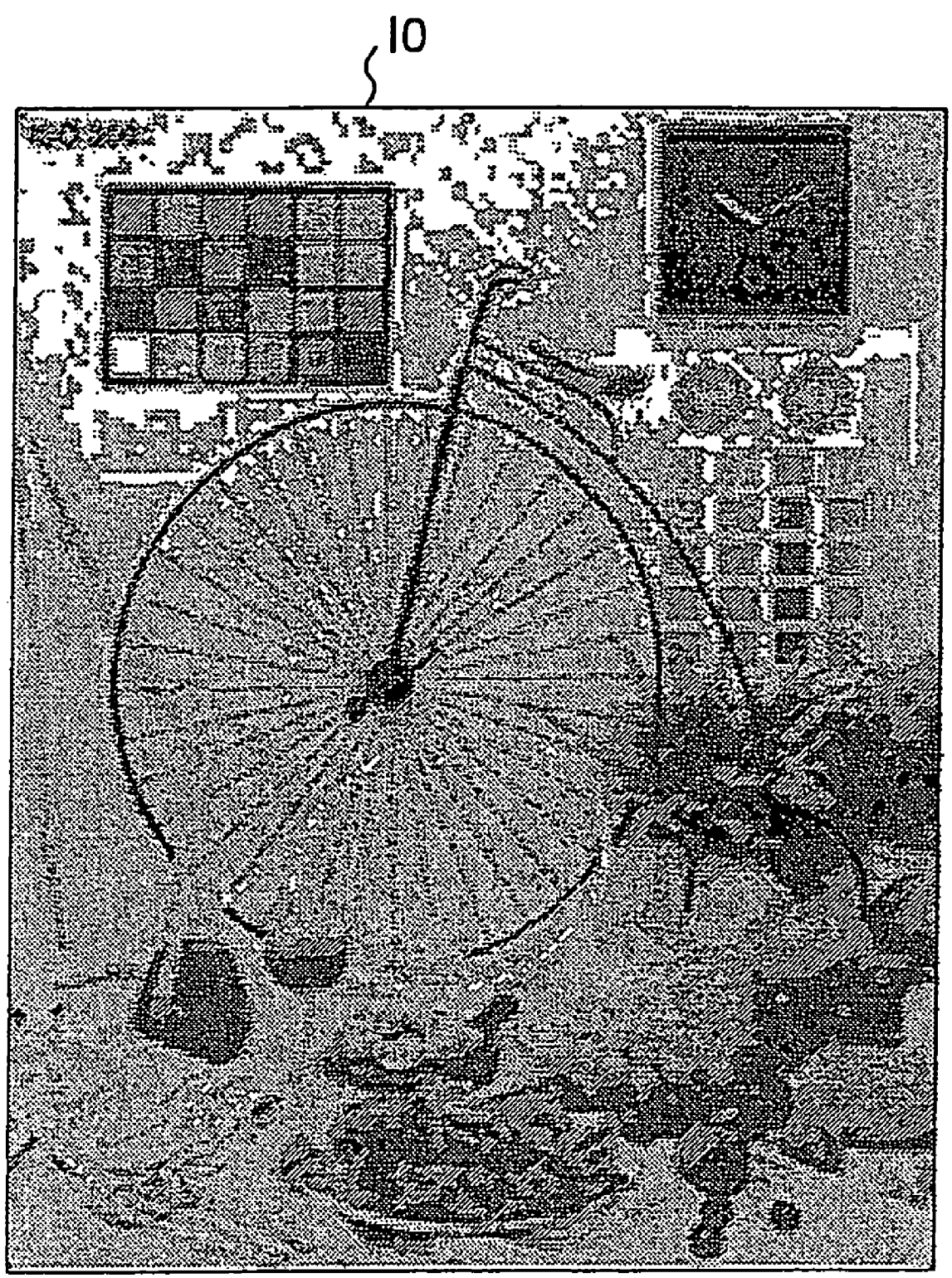
FIG. 2 is an example of original image data I0.

FIG. 2 shows an example of original image data I0. As discussed herein below, the code C will be embedded in the original image data I0. In the example shown in FIG. 2, the original image data I0 is a digital image, but the present invention is not limited to this example.

The original image data I0 is generated in a predetermined format and has a size of 1024×1024 pixels. The predetermined format may be JPEG (Joint Photographic Expert Group), GIF (Graphics Interchange Format) and the like. The code C (1010110101001010) having 16 bits illustrated in FIG. 4, for example, is embedded into the original image data I0.

Figure 3:
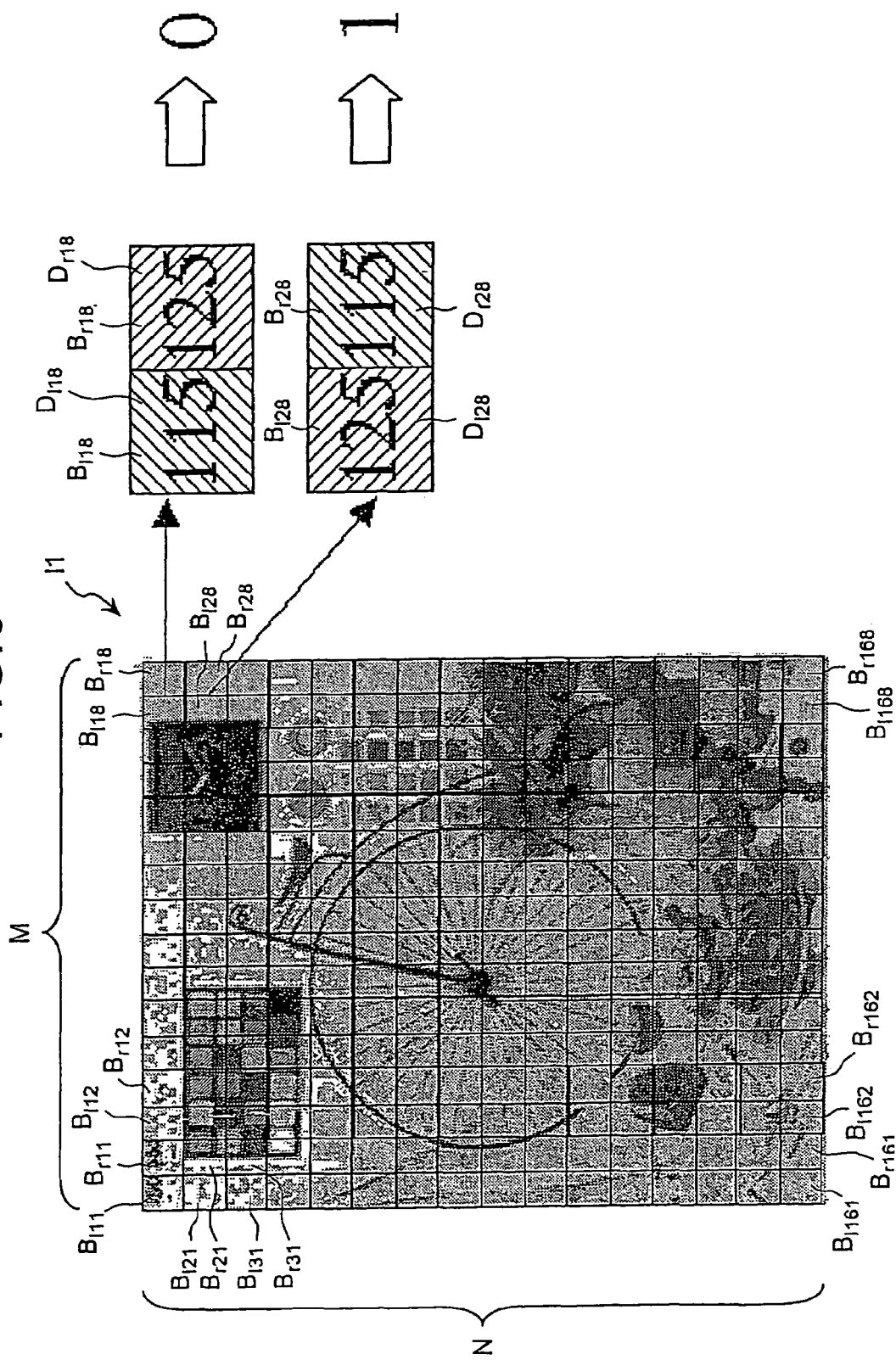
FIG. 3 is an example of image data I1.

In the encoder 100 shown in FIG. 1, a block dividing section 101 divides the original image data I0 into blocks of N rows×M columns (16×16, in the drawing) as illustrated in FIG. 3, and outputs the resultant data as image data I1 after division.

The image data I1 includes 256 (16×16) blocks having blocks $B_{l11}$, $B_{r11}$, ..., $B_{l18}$, $B_{r18}$, $B_{l21}$, $B_{r21}$, ..., $B_{l168}$, and $Br_{r168}$. One block is of 64×64 pixels.

A code of one bit is embedded into a pair of blocks.

This pair of blocks includes two blocks in proximity to each other. For example, these two blocks are adjacent horizontally or vertically to each other, or they are diagonal to each other and touch corner to corner.

In this embodiment, the pair of blocks includes two blocks adjacent horizontally to each other.

Concretely, the blocks $B_{l11}$ and $B_{r11}$, the blocks $B_{l12}$ and $B_{r12}$, ..., and the blocks $B_{l18}$ and $B_{r18}$ (a first row up to this block), the blocks $B_{l121}$ and $B_{r121}$, ..., and the blocks $B_{l128}$ and $B_{r128}$ (a second row up to this block), ..., and the blocks $B_{l161}$ and $B_{r161}$, ..., and the blocks $B_{l168}$ and $B_{r168}$ (a 16-th row up to this block), respectively, are the pairs of blocks.

In a block represented as $B_{lxy}$, the suffix l means that the block is on the left in the pair of the blocks, suffix x denotes a row (N), and suffix y denotes a column (M). On the other hand, in a block represented as $B_{rxy}$, the suffix r means that the block is on the right in the pair of the blocks, suffix x denotes a row (N), and suffix y denotes a column (M).

An average density, a characteristic amount, of the left block Blxy (i.e., average gradation of each pixel within the block) is expressed as left-side average density data $D_l$, and that of the right block $B_{rxy}$ is expressed as right-side average density data $D_r$.

When the left-side average density data $D_l$ is less than the right-side average density data $D_r$ as illustrated in the following expression, the pair of blocks express "0" as a code of one bit. On the other hand, when the left-side average density data $D_l$ is equal to or larger than the right-side average density data $D_r$, the pair of blocks express "1" as a code of one bit.

$D_l < D_r \rightarrow [0]$ $D_l \geq D_r \rightarrow [1]$

For example, as shown in FIG. 3, left-side average density data $D_{l18}$ of block $B_{l18}$ is "115" and right-side average density data $D_{r18}$ of $B_{r18}$ is "125" so that the pair of blocks $B_{l18}$, and $B_{r18}$ express "0" as a code of one bit.

Regarding the pair of blocks $B_{l28}$ and $B_{r28}$, left-side average density data $D_{l28}$ is "125", and right-side average density data $D_{r28}$ is "115". Therefore, the pair of blocks express "1" as a code of one bit.

In the image data I1, there are eight pairs of blocks in each row (i.e., total 16 blocks), and therefore, this data expresses a code of eight blocks. Accordingly, the total rows (16 rows) express codes of 128 bits in total. In the first embodiment, the code C (refer to FIG. 4) to be embedded into the image data I1 has 16 bits. Therefore, the code C can be embedded into the image data I1 by eight (i.e., 128/16) times (refer to FIG. 5).

Referring back to FIG. 1, a characteristic amount extracting section 107 includes a block extracting section 102, an averaging section 103, a register 104l, and a register 104r. A block extracting section 102 sequentially extracts the pair of blocks (the block $B_{lx}$, and the block $B_{rx}$) from the image data I1 (refer to FIG. 3) following a bit shift of the code C. The block extracting section 102 sequentially outputs density distributions of the block $B_{lx}$ and the block $B_{rx}$ as block density data D.

The bit shift of the code C refers to the shifting of a bit pointer (not illustrated) from the leftmost bit (1) to the right bit (0) illustrated in FIG. 4 by one bit each time.

An averaging section 103 calculates left-side average density data $D_l$ corresponding to the block $B_{lx}$ and right-side average density data $D_r$ corresponding to the block $B_{rx}$ from the block density data D, and sequentially stores the left-side average density data $D_l$ into a register $104_l$, and the right-side average density data $D_r$ into a register $104_r$ following the bit shift of the code C.

A comparing section 105 compares the n-th bit of the code C (n=1, 2, . . . , 16) with the result of a bit decision made from the magnitude relation between the left-side average density data $D_l$ and the right-side average density data $D_r$ stored in the register $104_l$ and the register $104_r$, respectively (bit decision is made as "0" or "1" from the expressions described above).

An encoding section 106 embeds the code C into the image data I1 (the original image data I0) based on the result of the comparison carried out by the comparing section 105, and outputs the code C embedded data, image coded data I3, to the outside of encoder 100. Specifically, when the result of the comparison carried out by the comparing section 105 indicates coincidence, the encoding section 106 maintains the magnitude relation between the left-side average density data $D_l$ and the right-side average density data $D_r$. On the other hand, when the result of the comparison indicates non-coincidence, the encoding section 106 changes the left-side average density data $D_l$ and the right-side average density data $D_r$ (i.e., reverses the magnitude relation) so as to obtain the magnitude relation that expresses the bit of the code C, generates the image coded data I3 (refer to FIG. 5), and outputs this data.

The image coded data I3 illustrated in FIG. 5 corresponds to the image data I1 (refer to FIG. 3) and the original image data I0 (refer to FIG. 2), and has areas $A_1$ to $A_8$. The same code C (1010110101001010) is embedded by eight times in total into the areas $A_1$ to $A_8$.

For example, the area $A_1$ corresponds to the blocks $B_{l11}$, $B_{r11}$, . . . , $B_{l28}$, and $B_{r28}$. Other areas $A_2$ to $A_8$ correspond to the blocks $B_{l31}$, $B_{r31}$, . . . , $B_{l168}$, and $B_{r168}$.

While FIG. 5 illustrates a state that the code C (refer to FIG. 3) is embedded, the actual image coded data I3 corresponds to the image data that is substantially the same as the original image data I0 (refer to FIG. 2) (i.e., it is substantially impossible to visually discriminate between these drawings although a part of the blocks may have changed density).

Constituent elements of the encoder 100 are connected to each other via a control section (not shown).

Figure 6:
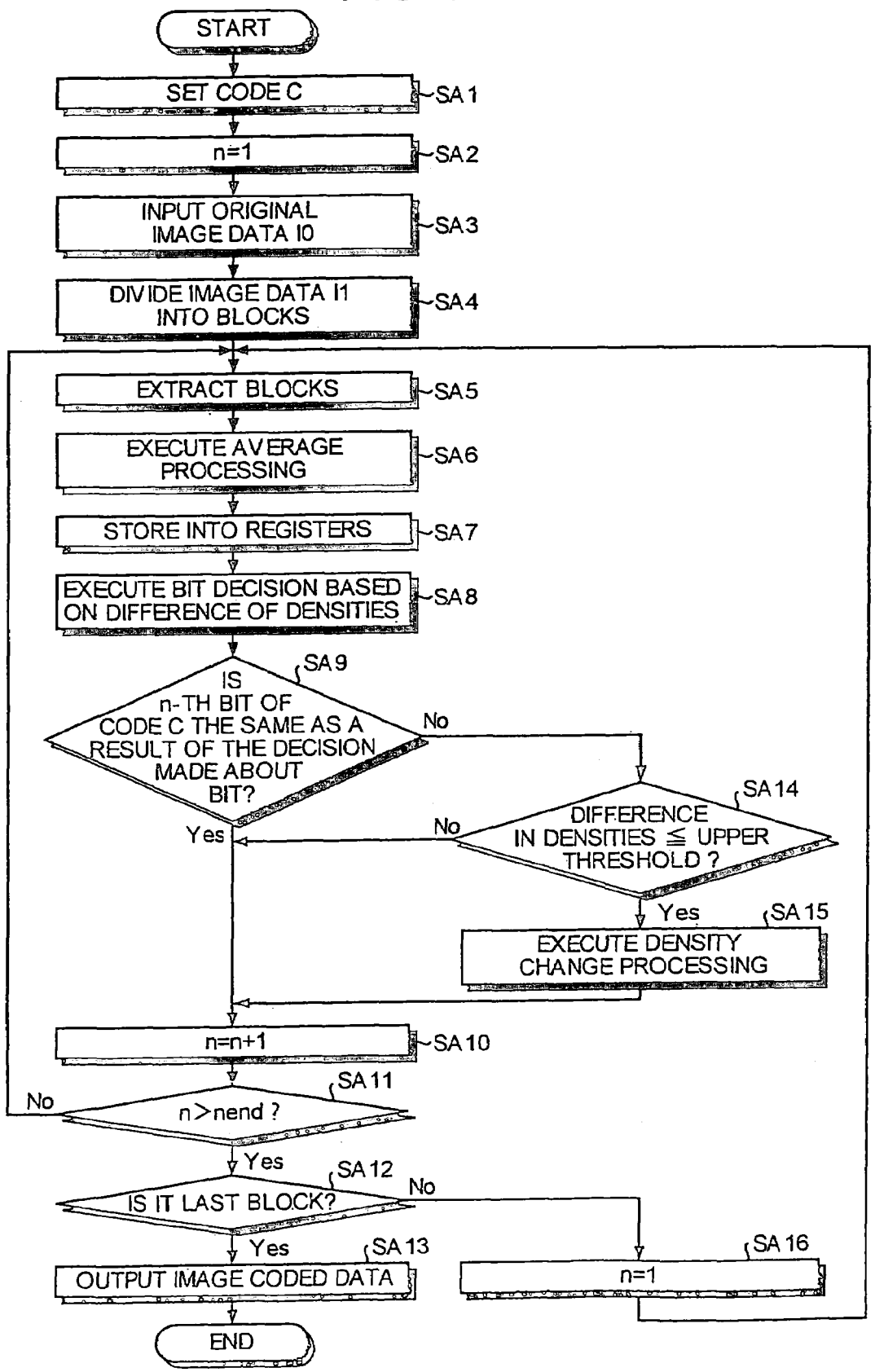
FIG. 6 is a flowchart of an operation example 1.

The operation of the encoder 100 is explained with reference to flowcharts in FIG. 6 and FIG. 8. FIG. 6 is a flowchart that explains an operation example 1 of the encoder 100.

At operation SA1, the code C is set to the comparing section 105. At operation SA2, the comparing section 105 initializes n to 1. n denotes a pointer of the bit of the code C. n=1 corresponds to the leftmost bit ("1") of the code C.

At operation SA3, the original image data I0 is input to the block dividing section 101. At operation SA4, the block dividing section 101 divides the original image data I0 into 16×16 blocks $B_{l11}$ to $B_{r168}$ and outputs the result as the image data I1 to the block extracting section 102.

At operation SA5, the block extracting section 102 extracts a pair of blocks corresponding to n=1 (i.e., the block $B_{l11}$ and the block $B_{r11}$) from the image data I1. Then, the block extracting section 102 outputs the density distributions of the block $B_{l11}$ and the block $B_{r11}$ as the block density data D to the averaging section 103.

At operation SA6, the averaging section 103 obtains the left-side average density data $D_{l11}$ of the block $B_{l11}$ and the right-side average density data $D_{r11}$ of the block $B_{r11}$ from the block density data D by the average processing.

At operation SA7, the averaging section 103 provides a control to store the left-side average density data $D_{l11}$ into the register $104_l$ and store the right-side average density data $D_{r11}$ into the register $104_r$.

At operation SA8, the comparing section 105 obtains "1" that is the leftmost bit (corresponding to n=1) of the code C, and a difference between the left-side average density data $D_{l11}$ and the right-side average density data $D_{r11}$ and executes the bit decision based on the difference in the densities (i.e., magnitude relation).

Concretely, if the left-side average density data $D_{l11}$ is equal to or larger than the right-side average density data $D_{r11}$, the comparing section 105 sets "1" as a result of the decision made for the pair of blocks based on the above magnitude relation.

At operation SA9, the comparing section 105 decides whether the n-th bit (in this case, the first bit "1") of the code C is the bit for which the decision made about the bit (in this case, "1") at operation SA8. In this case, the comparing section 105 sets "Yes" as a result of the decision.

At operation SA10, the comparing section 105 increment n by 1. As a result, n becomes 2. At operation SA11, the comparing section 105 decides whether n is larger than nend, where nend is a total number of bits of the code C (refer to FIG. 4), and in the current example it is equal to 16. Because n is 2, the comparing section 105 sets "No" as a result of the decision made at operation SA11.

At operation SA5, the block extracting section 102 extracts a pair of blocks corresponding to n=2 (i.e., the block $B_{l12}$ and the block $B_{r12}$) from the image data I1. Then, the block extracting section 102 outputs the density distributions of the block $B_{l12}$ and the block $B_{r12}$ as the block density data D to the averaging section 103.

At operation SA6, the averaging section 103 obtains the left-side average density data $D_{l12}$ of the block $B_{l12}$ and the right-side average density data $D_{r12}$ of the block $B_{r12}$ from the block density data D by the average processing.

At operation SA7, the averaging section 103 provides a control to store the left-side average density data $D_{l12}$ into the register $104_l$ and store the right-side average density data $D_{r12}$ into the register $104_r$.

At operation SA8, the comparing section 105 obtains "0" that is the next bit (corresponding to n=2) of the code C, and a difference between the left-side average density data $D_{l12}$ and the right-side average density data $D_{r12}$ stored in the register $104_l$ and the register $104_r$ respectively, and executes the bit decision based on the difference of densities (i.e., magnitude relation).

If the left-side average density data $D_{l12}$ is less than the right-side average density data $D_{r11}$, the comparing section 105 sets "0" as a result of the decision made for the pair of blocks based on the above magnitude relation.

At operation SA9, the comparing section 105 decides whether the n-th bit (in this case, the second bit "0") of the code C is the bit for which the decision is made about the bit (in this case, "0") at operation SA8. In this case, the comparing section 105 sets "Yes" as a result of the decision.

At operation SA10, the comparing section 105 increments n by 1. As a result, n becomes 3. At operation SA11, the comparing section 105 decides whether n (i.e., 3) is larger than nend (i.e., 16). In this case, the comparing section 105 sets "No" as a result of the decision made. Thereafter, the operation at operation SA5 and after is repeated until when the result of the decision made at operation SA11 becomes "Yes".

When n is 16 at operation SA10 and also when the result of the decision made at operation SA11 is "No", at operation SA5, the block extracting section 102 extracts a pair of blocks corresponding to n=16 (in this case, the block $B_{l28}$ and the block $B_{r28}$) from the image data I1. Then, the block extracting section 102 outputs the density distributions of the block $B_{l28}$ and the block $B_{r28}$ as the block density data D to the averaging section 103.

At operation SA6, the averaging section 103 obtains the left-side average density data $D_{l28}$ ("125", see FIG. 3) corresponding to the block $B_{l28}$ and the right-side average density data $D_{r28}$ ("115", see FIG. 3) corresponding to the block $B_{r28}$ from the block density data D by the average processing.

At operation SA7, the averaging section 103 provides a control to store the left-side average density data $D_{l28}$ ("125") into the register $104_l$ and store the right-side average density data $D_{r28}$ ("115") into the register $104_r$.

At operation SA8, the comparing section 105 obtains "0" that is the right bit (corresponding to n=16) of the code C illustrated in FIG. 4, and a difference of densities (10) between the left-side average density data $D_{l28}$ ("125") and the right-side average density data $D_{r28}$ ("115") stored in the register $104_l$ and the register $104_r$ respectively, and executes the bit decision based on the difference of densities (i.e., magnitude relation).

In the current example, as the left-side average density data $D_{l28}$ ("125") is larger than the right-side average density data $D_{r28}$ ("115"), the comparing section 105 sets "1" as a result of the decision made for the pair of blocks based on the above magnitude relation.

At operation SA9, the comparing section 105 decides whether the n-th bit (in this case, the 16-th bit "0") of the code C is the bit for which the decision is made about the bit (in this case, "1") at operation SA8. In this case, the comparing section 105 sets "No" as a result of the decision.

At operation SA14, the comparing section 105 decides whether the difference of densities (10) obtained at operation SA8 is equal to or less than an upper threshold (for example, 100) set in advance, and in this case, sets "Yes" as a result of the decision made.

At operation SA15, the encoding section 106 executes the density change processing to change the left-side average density data $D_{l28}$ and the right-side average density data $D_{r28}$ such that the result of the bit decision based on the magnitude relation between the left-side average density data $D_{l28}$ ("125") and the right-side average density data $D_{r28}$ ("115") becomes the same as the n-th bit (in this case, the 16-th bit "0") of the code C.

In other words, the encoding section 106 reverses the magnitude relation between the left-side average density data $D_{l28}$ ("125") and the right-side average density data $D_{r28}$ ("115") such that the left-side average density data $D_{l28}$ becomes less than the right-side average density data $D_{r28}$, and changes the densities such that the result of the bit decision changes from "1" to "0".

Specifically, the encoding section 106 obtains left-side average density data $D'_l$ after the change (corresponding to left-side average density data $D'_{l28}$ after the change) from an expression (1) of (A) when $D_l < D_r$ illustrated in FIG. 7. After this, the encoding section 106 obtains right-side average density data $D'_r$ after the change (corresponding to right-side average density data $D'_{r28}$ after the change) from an expression (2) shown in FIG. 7.

As a result, after the change of the densities, the left-side average density data $D'_{l28}$ becomes less than the right-side average density data $D'_{r28}$, and the result of the bit decision changes from "1" to "0".

On the other hand, in order to obtain (B) $D_l \geq D_r$ illustrated in FIG. 7, left-side average density data $D'_l$ after the change (corresponding to left-side average density data $D'_{lxy}$ after the change) is obtained from an expression (3) shown in FIG. 7. After this, right-side average density data $D'_r$ after the change (corresponding to right-side average density data $D'_{rxy}$ after the change) is obtained from an expression (4) shown in FIG. 7.

As a result, after the change of the densities, the left-side average density data $D'_{lxy}$ becomes equal to or larger than the right-side average density data $D'_{rxy}$, and the result of the bit decision changes from "0" to "1".

When the result of the decision made at operation SA14 is "No", that is, when the difference of densities obtained at operation SA8 is larger than the upper threshold, the processing at operation SA10 is executed without executing the density change processing.

The reason is explained below in detail. When the difference of densities in the pair of blocks is large, the execution of the density change processing apparently reveals the change. Therefore, in order to prevent the image quality from being degraded (unnatural image), the density change is not executed intentionally.

At operation SA10, the comparing section 105 increments n by 1. As a result, n becomes 17. At operation SA11, the comparing section 105 decides whether n (=17) is larger than nend (=16). In this case, the comparing section 105 sets "Yes" as a result of the decision made.

At operation SA12, the comparing section 105 decides whether the processing concerning the last pair of blocks (the blocks $B_{l168}$ and $B_{r168}$) in the image data I1 ends, and, in this case, sets "No" as a result of the decision made.

At operation SA16, the comparing section 105 resets n to 1. At operation SA5, the block extracting section 102 extracts the next pair of blocks corresponding to n=1 (in this case, the block $B_{l31}$, and the block $B_{r31}$) from the image data I1. Then, the block extracting section 102 outputs the density distributions of the block $B_{l31}$, and the block $B_{r31}$ as the block density data D to the averaging section 103.

Thereafter, the above operation is repeated until when the result of the decision made at operation SA12 becomes "Yes".

When the result of the decision made at operation SA12 is "Yes", at operation SA13, the encoding section 106 generates and outputs the image coded data I3, based on the result of the decision made at operation SA9, the result of the decision made at operation SA14, and the density change processing at operation SA15.

Specifically, when the result of the decision made at operation SA9 for the pair of blocks is "Yes" (when the result of the decision made at operation SA14 is "No"), the encoding section 106 maintains the magnitude relation between the left-side average density data $D_l$ and the right-side average density data $D_r$ (i.e., no change in the densities). On the other hand, based on the density change processing at operation SA15, the encoding section 106 generates the image coded data I3 corresponding to the left-side average density data $D'_l$ and the right-side average density data $D'_r$ after the change, based on the density change processing at operation SA15. The decoder 200 described later decodes this image coded data I3.

The same code C (1010110101001010) is embedded by eight times in total into the areas $A_1$ to $A_8$ in the image coded data I3 illustrated in FIG. 5.

An operation example 2 of the encoder 100 is explained in detail below with reference to a flowchart in FIG. 8. In FIG. 8, operation SB10 and operation SB11 are added to the flowchart.

Figure 8:
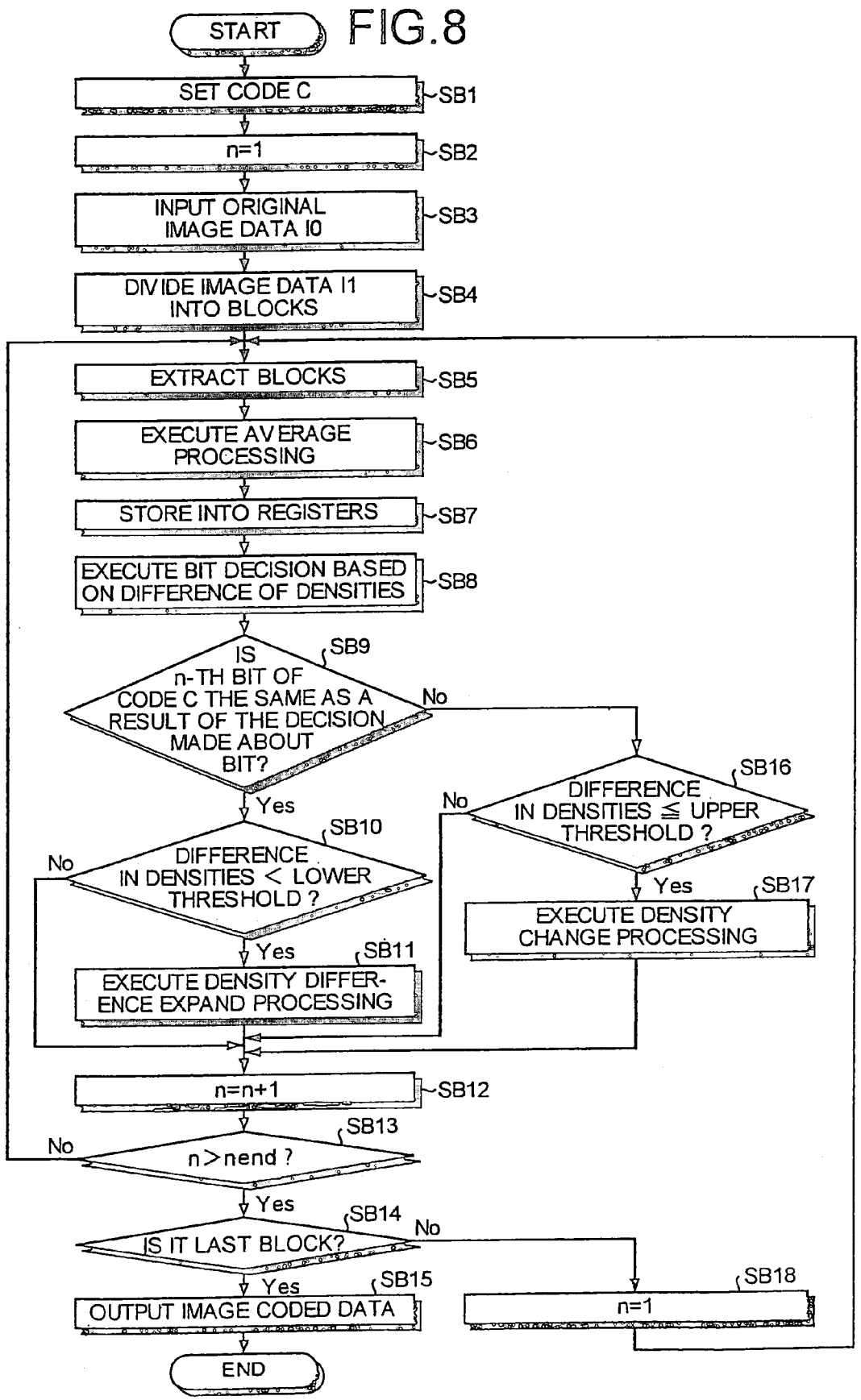
FIG. 8 is a flowchart of an operation example 2.

Because operations SB1 to SB9 and SB12 to SB18 in FIG. 8 are same as the operations SA1 to SA16 in FIG. 6, their detailed explanation is omitted.

At operation SB9 illustrated in FIG. 8, the comparing section 105 decides whether the n-th bit of the code C is the same as a result of the bit decision made at operation SB8, and, in this case, sets "Yes" as a result of the decision made.

At operation SB10, the comparing section 105 decides whether the difference in the densities obtained at operation SB8 is less than a lower threshold (for example 10) set in advance. In this case, it is assumed that the result of the decision made is "Yes".

When the difference of densities is less than the lower threshold, the magnitude relation is reversed and the precision becomes low.

In order to avoid this problem, at operation SB11, the encoding section 106 adjusts the left-side average density data $D_l$ and the right-side average density data $D_r$ such that the difference of densities becomes equal to or higher than the lower threshold, and executes a density difference expand processing to expand the difference of densities.

When the result of the decision made at operation SB10 is "No", that is, when the difference in the densities is equal to or higher than the lower threshold, the processing at operation SB12 is executed. When the result of the decision made at operation SB16 is "No", the processing at operation SB12 is also executed.

Figure 9:
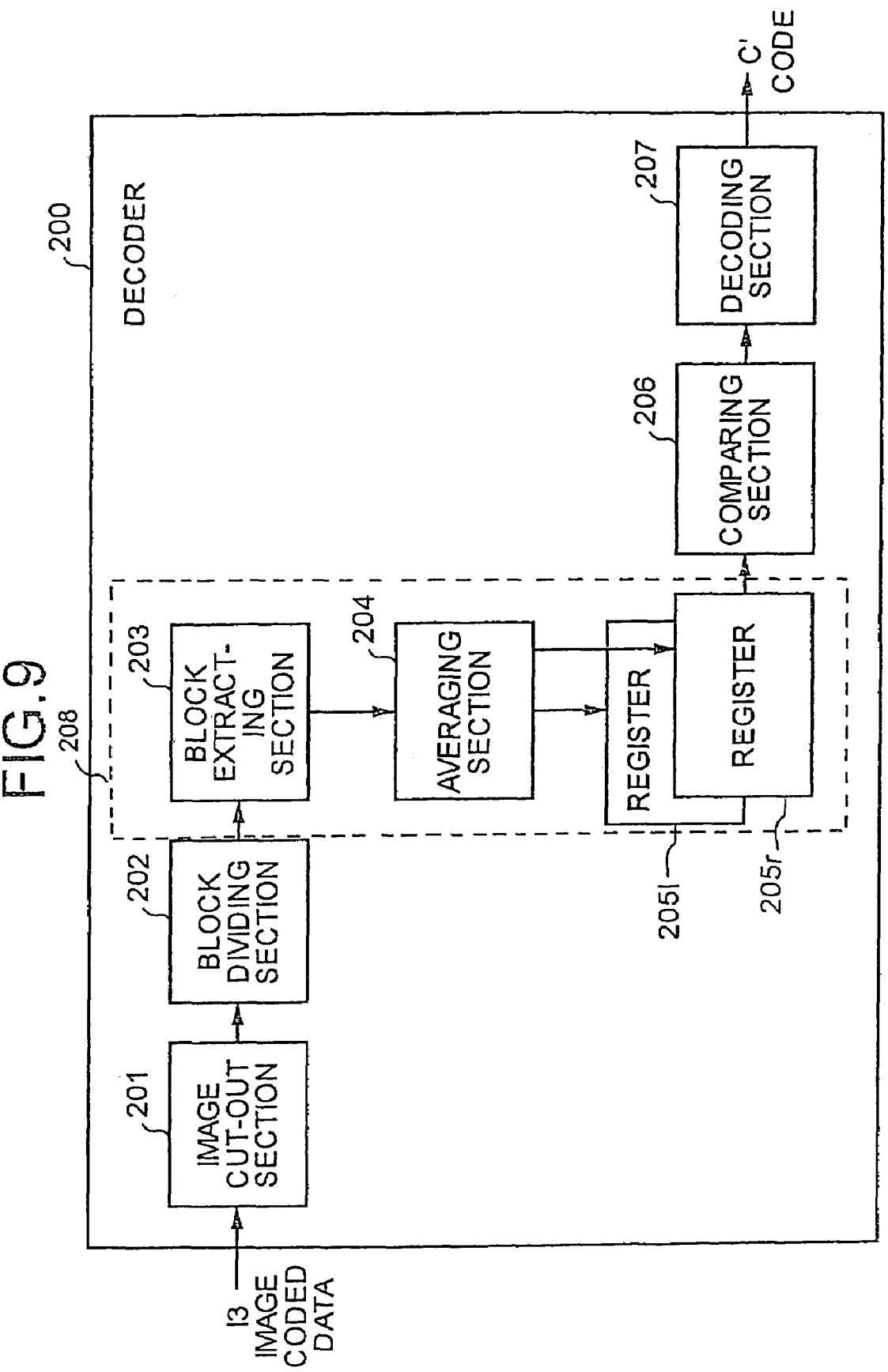
FIG. 9 is a block diagram of the decoder 200 according to the first embodiment.

FIG. 9 is a block diagram of the decoder 200 according to the first embodiment. The decoder 200 decodes a code that is embedded in the image coded data I3 that is encoded by the encoder 100.

The decoder 200 includes an image cut-out section 201 that cuts out the effective image coded data I3 from the total when the surrounding of the image coded data I3 includes image data (for example, blank space). However, when only the image coded data I3 is input to the image cut-out section 201, the image cut-out section 201 does not cut out data.

The decoder 200 includes a block dividing section 202 that divides the image coded data I3 output from the image cut-out section 201 into blocks of N rows×M columns (16×16, in the drawing) in the same manner as the block dividing section 101 of the encoder 100 divides the original image data I0, and outputs the result as image data divided into blocks.

The decoder 200 includes a characteristic amount extracting section 208, and wherein characteristic amount section 208 includes a block extracting section 203, an averaging section 204, a register 205$l$, and a register 205$r$. a block extracting section 203 that sequentially extracts pairs of blocks (two blocks) from the image data divided into blocks in the same manner as the block extracting section 102 of the encoder 100 extracts the pairs of blocks. The block extracting section 203 sequentially outputs density distributions of the pair of blocks (two blocks) as block density data.

The decoder 200 includes an averaging section 204 that obtains left-side average density data corresponding to one of the pair of blocks and right-side average density data corresponding to the other block from the block density data, and sequentially stores these data into a register $205_l$ and a register $205_r$ following the bit shift of the code, in a similar manner to that of the averaging section 103 (refer to FIG. 1).

A comparing section 206 compares a magnitude relation between the left-side average density data and the right-side average density data stored in the register $205_l$ and the register $205_r$ respectively, thereby making a bit decision. The comparing section 206 outputs a code group CG (candidate codes $C_1$ to $C_8$: refer to FIG. 10) corresponding to the result of the bit decision (bit decided as "0" or "1" from the expression described above), to a decoding section 207.

Each of the candidate codes $C_1$ to $C_8$ has 16 bits, and is the result that each code (16 bits) embedded into the areas $A_1$ to $A_8$ of the image coded data I3 (refer to FIG. 5) is decoded. Each code is a candidate of a code C' (refer to FIG. 9) as a result of the decoding by the decoder 200.

In the candidate codes $C_1$ to $C_8$, "2" denotes a bit for which a bit decision about "1" or "0" is uncertain.

The decoding section 207 makes each bit (16 bits) firm based on a majority decision in a bit unit (a bit string in a vertical direction in the drawing) from the candidate codes $C_1$ to $C_8$ corresponding to the result of the comparison by the comparing section 206, as illustrated in FIG. 10. The decoding section 207 outputs this result as the code C' of the result of decoding by the decoder 200.

Constituent elements of the decoder 200 are connected to each other via a control section (not shown).

The operation of the decoder 200 is explained with reference to a flowchart illustrated in FIG. 11.

At operation SC1, the image coded data I3 (refer to FIG. 1) is input to the image cut-out section 201. At operation SC2, n is initialized to 1. n denotes a pointer of the bit of a code to be decoded. In this case, n=1 corresponds to the leftmost bit of the code.

At operation SC3, when the surrounding of the input image coded data I3 includes image data (for example, blank space), the image cut-out section 201 cuts out the effective image coded data I3 from the total.

At operation SC4, the block dividing section 202 divides the image coded data I3 cut out by the image cut-out section 201 into 16×16 blocks based on the block divide processing, and outputs the result as the image data divided into blocks to the block extracting section 203, in a similar manner to that of the block dividing section 101 (refer to FIG. 1).

At operation SC5, the block extracting section 203 extracts a pair of blocks (two blocks) corresponding to n=1 from the image data divided into blocks, and outputs the density distributions of these blocks as the block density data to the averaging section 204, in a similar manner to that of the block extracting section 102 (refer to FIG. 1).

At operation SC6, the averaging section 204 obtains left-side average density data corresponding to one of the pair of blocks and right-side average density data corresponding to the other block from the block density data by the average processing, in a similar manner to that of the averaging section 103 (refer to FIG. 1).

At operation SC7, the averaging section 204 provides a control to store the left-side average density data into a register $205_l$ and store the right-side average density data into a register $205_r$.

At operation SC8, the comparing section 206 compares a magnitude relation between the left-side average density data and the right-side average density data stored in the register $205_l$ and the register $205_r$ respectively, thereby making a bit decision. The comparing section 206 outputs the result of the bit decision (bit decided as "0" or "1" from the expression described above), to the decoding section 207.

The comparing section 206 obtains a difference between the left-side average density data and the right-side average density data. When the difference of densities is larger than a certain upper threshold, the comparing section 206 sets the result of the bit decision to "2" (uncertain: refer to FIG. 10) by regarding that the bit decision result corresponding to the pair of blocks is not reliable.

At operation SC9, the comparing section 206 increments n by 1. As a result, n becomes 2. At operation SC10, the comparing section 206 decides whether n is larger than nend (=16), and in this case, sets "No" as a result of the decision made.

Thereafter, the operation at operation SC5 and after is repeated until when the result of the decision made at operation SC10 becomes "Yes".

When n becomes 17 at operation SC9, the result of the decision made at operation SC10 is set to "Yes". At this point of time, the comparing section 206 sets the candidate code $C_l$ illustrated in FIG. 10 as a result of the bit decision.

At operation SC11, the comparing section 206 decides whether the processing concerning the last pair of blocks (two blocks) in the image data divided into blocks ends, and, in this case, sets "No" as a result of the decision made.

At operation SC14, the comparing section 206 sets n to 1 in order to reset n (=17). At operation SC5, the block extracting section 203 extracts the next pair of blocks (two blocks) corresponding to n=1 from the image data divided into blocks. Then, the block extracting section 203 outputs the density distributions of the blocks as the block density data to the averaging section 204.

Thereafter, the above operation is repeated until when the result of the decision made at operation SC11 becomes "Yes".

When the result of the decision made at operation SC11 becomes "Yes", at operation SC12, the decoding section 207 executes a majority decision processing. In other words, at this point of time, the candidate codes $C_1$ to $C_8$ illustrated in FIG. 10 are bit decision result.

The decoding section 207 makes each bit (16 bits) firm based on a majority decision in a bit unit (a bit string in a vertical direction in the drawing) from the candidate codes $C_1$ to $C_8$. For example, in the case of the leftmost bit of the candidate codes $C_1$ to $C_8$, "0" is 2, "1" is 5, and "2" is 1. Therefore, the leftmost bit of the code C' is decided as "1" based on the majority decision.

At operation SC13, upon reception of the result of the majority decision processing, the decoding section 207 outputs the code C' (refer to FIG. 10) as a result of the decoding by the decoder 200. The code C' is the same as the code C (refer to FIG. 4).

As explained above, according to the first embodiment, one bit (code) is related to each pair of blocks in a plurality of blocks (image data I1: refer to FIG. 3) that are obtained by dividing the original image data I0 (refer to FIG. 2), based on a magnitude relation of the average density (characteristic amount), and the code C (plurality of codes) is embedded into a plurality of blocks. Thus, because it is not required to calculate the FFT the processing required to embed the code into the image data can be reduced.

According to the first embodiment, as explained in the operation example 1 (refer to FIG. 6), when the magnitude relation of the average density in the pair of blocks does not coincide with the bit (code) to be embedded, the average density of the pair of blocks is changed so as to reverse the magnitude relation. Therefore, an optional code can be embedded as desired.

According to the first embodiment, as explained in the operation example 1 (refer to FIG. 6), when the difference of densities between the pair of blocks (i.e., difference between characteristic amounts) exceeds an upper threshold, the average density is not changed. Therefore, it is possible to prevent the image quality from being degraded following an excessive change of the average density.

According to the first embodiment, as explained in the operation example 2 (refer to FIG. 8), when the magnitude relation of the average density (characteristic amount) coincides with the bit (code) to be embedded and also when the difference of densities between the pair of blocks (i.e., difference between characteristic amount) is less than a lower threshold, the average density is changed such that the difference becomes equal to or higher than the lower threshold. Therefore, when the decoder 200 decodes the code, a reduction in the precision such as a reversal of the magnitude relation can be prevented.

According to the first embodiment, because the characteristic amount of the average density is employed, the characteristic amount can be calculated with lesser calculations and quickly.

According to the first embodiment, the code C is embedded repeatedly (eight times) as illustrated in FIG. 5. Therefore, an uncertain code can be specified by the majority decision at the decoding time, and reliability can be increased.

Thus, according to the first embodiment, it is possible to provide decoder can reduce the processing required to decode the code in the image data.

Second Embodiment

It is explained in the first embodiment that the encoder 100 performs embedding the code C (refer to FIG. 4) and the decoder 200 decodes the embedded code C. However, instead of using the code C, an error-correction-coding code is embedded using error correction coding (for example, BCH (Bose Chaudhuri Hocquenghem) code, or Reed Solomon code), and a decoder decodes the embedded error-correction-coding code. This configuration example is explained as the second embodiment.

Figure 12:
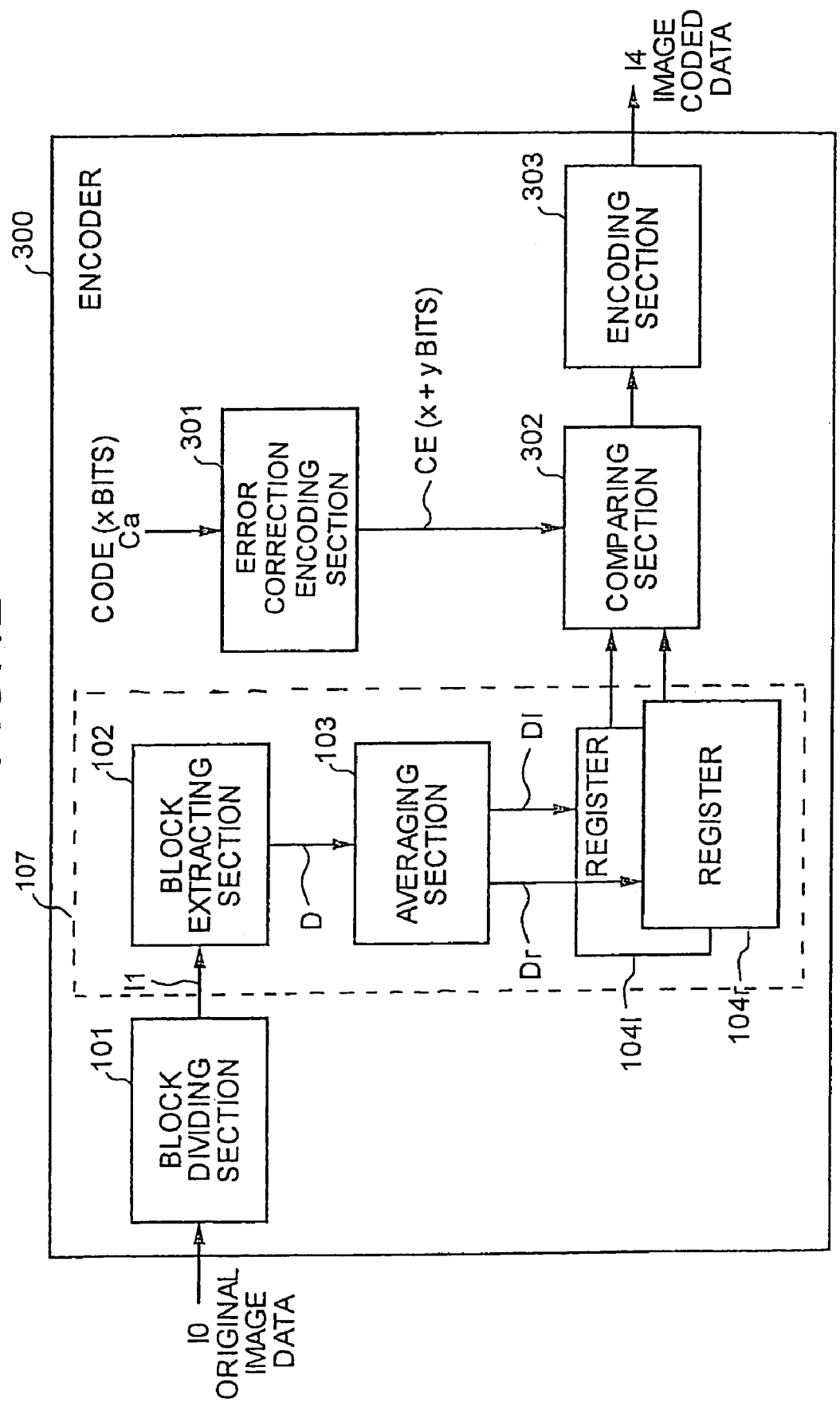
FIG. 12 is a block diagram of an encoder 300 according-to the second embodiment.
Figure 13:
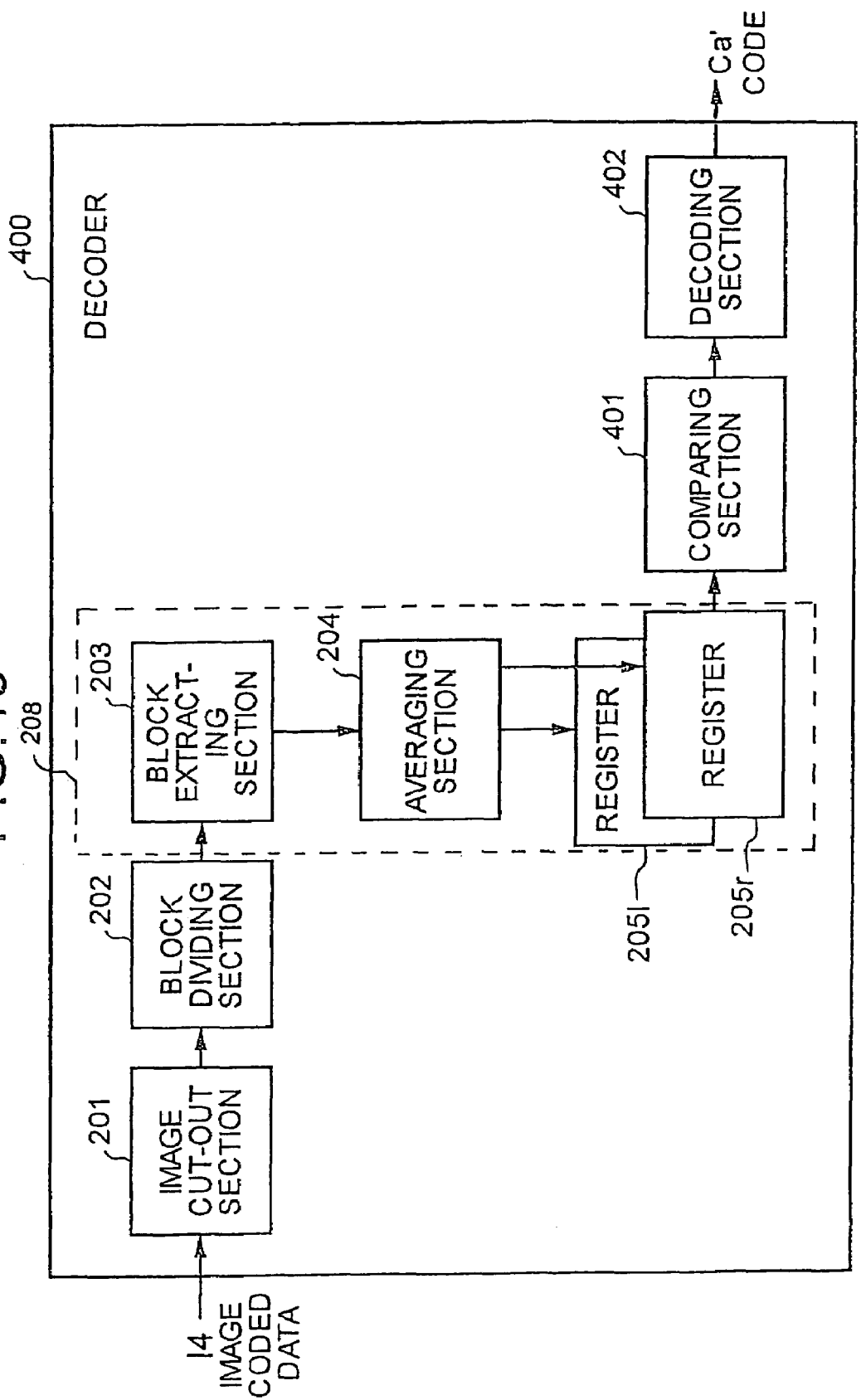
FIG. 13 is a block diagram of a decoder 400 according to the second embodiment.

An encoder 300 shown in FIG. 12 and a decoder 400 shown in FIG. 13 are examples of an image data processing apparatus according to the second embodiment. The encoder 300 embeds a code (binary) as separate data into an original image data, and generates image coded data, and the decoder 400 reads the code from the image coded data.

FIG. 12 is a block diagram of the encoder 300. In this drawing, portions corresponding to those in FIG. 1 are designated with like reference numerals, and their explanation is omitted.

In FIG. 12, an error correction code encoding section 301 is newly provided, and a comparing section 302 and an encoding section 303 are provided in place of the comparing section 105 and the encoding section 106 shown in FIG. 1.

The error correction code encoding section 301 encodes a code Ca including x bits using error-correction-coding (for example, a BCH signal), and generates error-correction-coding CE.

The code for error-correction-coding CE includes the code Ca (x bits), and a redundant bit (y bits) that is calculated from the code Ca and a predetermined calculation expression, and has (x+y) bits (for example, 15 bits). According to this error-correction-coding code CE, even when an error of three bits occurs, the original code Ca can be restored based on the error correction.

The encoder 300 embeds the error-correction-coding code CE eight times, for example, into the original image data I0 (refer to FIG. 2), and generates image coded data I4. The encoder 300 is different from the encoder 100 in that the encoder 300 uses error-correction-coding code CE, while the encoder 100 uses the code C.

The comparing section 302 compares the n-th bit of the error-correction-coding code CE with the result of a bit decision made from the magnitude relation between the left-side average density data $D_l$ and the right-side average density data $D_r$ stored in the register $104_l$ and the register $104_r$ respectively (a bit decision is made as "0" or "1" from the relational expression described in the first embodiment: refer to FIG. 3).

The encoding section 303 executes a processing to embed the error-correction-coding code CE into the image data I1 (the original image data I0) based on the result of the comparison carried out by the comparing section 302. Specifically, when the result of the comparison carried out by the comparing section 302 indicates coincidence, the encoding section 303 maintains the magnitude relation between the left-side average density data $D_l$ and the right-side average density data $D_r$. On the other hand, when the result of the comparison indicates non-coincidence, the encoding section 303 changes the left-side average density data $D_l$ and the right-side average density data $D_r$ (i.e., reverses the magnitude relation) so as to obtain the magnitude relation that expresses the bit of the error-correction-coding CE, generates the image coded data I4, and outputs this data.

This image coded data I4 has the same configuration as the image coded data I3. Therefore, the same error-correction-coding code CE (15 (x+y) bits) is embedded by eight times in total into the image coded data I4.

Constituent elements of the encoder 300 are connected to each other via a control section not illustrated.

The operation of the encoder 300 is similar to that of the encoder 100 except that the error-correction-coding code CE is used, and therefore, the explanation is omitted.

FIG. 13 is a block diagram of the decoder 400. The decoder 400 decodes the embedded error-correction-coding code CE (code Ca) from the image coded data I4 that is encoded by the encoder 300.

In FIG. 13, portions corresponding to those in FIG. 9 are designated with like reference numerals, and their explanation is omitted. In FIG. 13, a comparing section 401 and a decoding section 402 are provided in place of the comparing section 206 and the decoding section 207 shown in FIG. 9.

The comparing section 401 compares a magnitude relation between the left-side average density data and the right-side average density data stored in the register $205_l$ and the register $205_r$ respectively, thereby making a bit decision, in a similar manner to that of the comparing section 206 (refer to FIG. 9). The comparing section 401 outputs a candidate error-correction-coding code group CEG (candidate error-correction-coding codes $CE_1$ to $CE_8$: refer to FIG. 15) corresponding to the result of the bit decision (bit decided as "0" or "1" from the expression explained in the first embodiment), to a decoding section 402.

Each of the candidate error-correction-coding codes $CE_1$ to $CE_8$ has 15 (x+y) bits, and is the result that eight error-correction-coding codes (15 bits) embedded into the image coded data I4 are decoded. Each code is a candidate of an error-correction-coding code for CE' (refer to FIG. 15).

In the candidate error-correction-coding codes $CE_1$ to $CE_8$, "2" denotes a bit for which a bit decision about "1" or "0" is uncertain.

Figure 15:
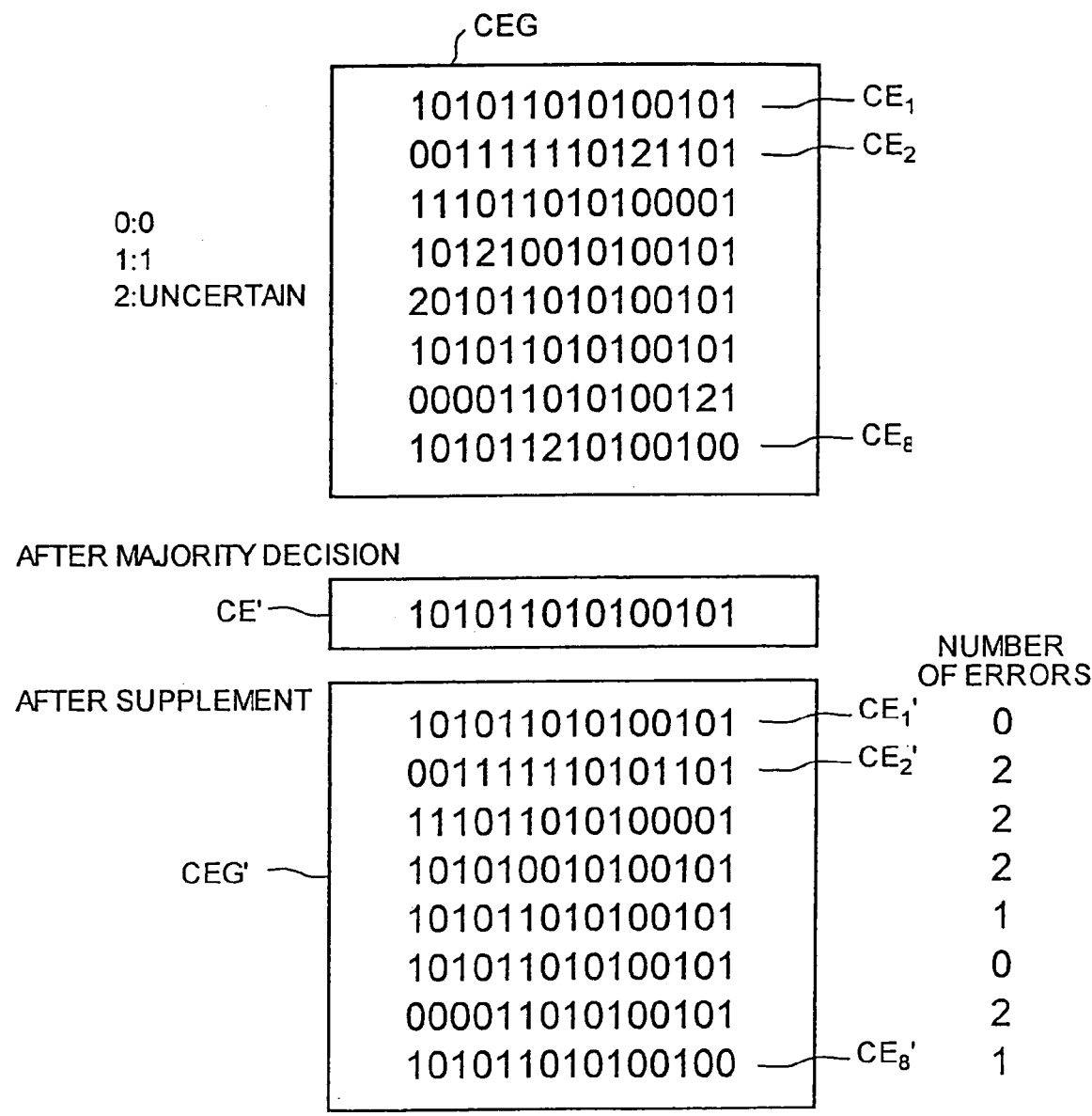
FIG. 15 explains about the code determination processing by the decoder 400.

The decoding section 402 makes each bit (15 bits in total) firm based on a majority decision in a bit unit (a bit string in a vertical direction in the drawing) from the candidate error-correction-coding codes $CE_1$ to $CE_8$ corresponding to the result of the comparison by the comparing section 401, as illustrated in FIG. 15. The decoding section 402 outputs this result as the error-correction-coding code CE'.

Strictly speaking, the error-correction-coding code CE' has a risk of including an error bit. Therefore, in the second embodiment, the decoding section 402 executes a supplement processing to replace the bit of "2" (uncertain) in the candidate error-correction-coding codes $CE_1$ to $CE_8$ (i.e., the candidate error-correction-coding code group CEG) with a corresponding bit in the error-correction-coding code CE', and obtains candidate error-correction-coding codes $CE'_1$ to $CE'_8$ (a candidate error-correction-coding code group CEG').

The decoding section 402 executes an error correction decode processing (for example, a decode processing based on the BCH code) for each of the candidate error-correction-coding codes $CE'_1$ to $CE'_8$, and obtains a code (corresponding to the code Ca illustrated in FIG. 12, for example) and number of errors. The number of errors is number of error bits in each of the error-correction-coding codes $CE'_1$ to $CE'_8$.

The decoding section 402 outputs a code corresponding to a minimum number of errors among codes obtained by the error correction decode processing, as a code Ca'. This code Ca' is the result of decoding by the decoder 400.

Constituent elements of the decoder 400 are connected to each other via a control section not illustrated.

Figure 14:
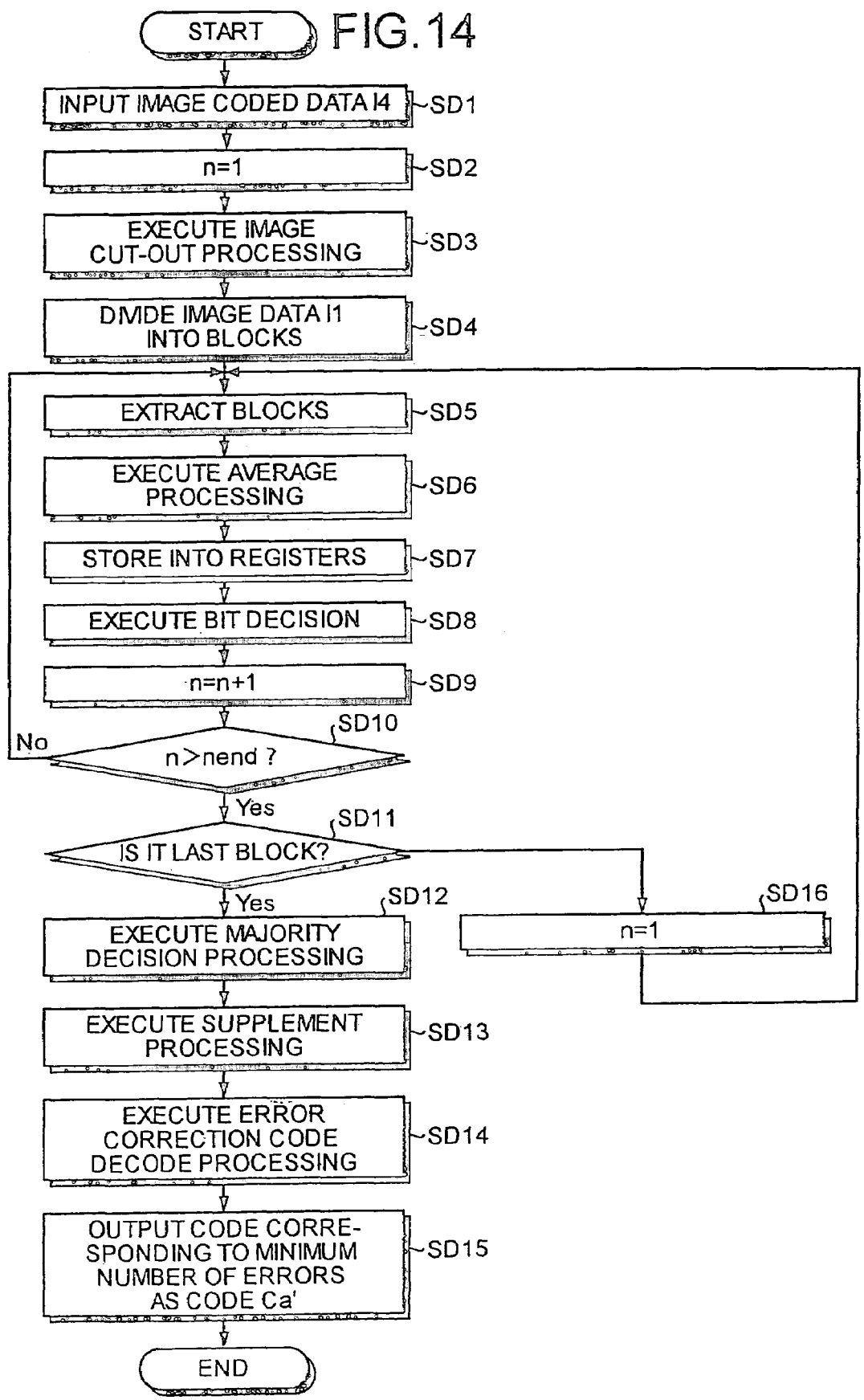
FIG. 14 is a flowchart of operations performed by the decoder 400.

Next, the operation of the decoder 400 illustrated in FIG. 13 is explained with reference to a flowchart illustrated in FIG. 14.

In the drawing, at operation SD1, the image coded data I4 (refer to FIG. 12 and FIG. 13) is input to the image cut-out section 201. At operation SD2, n is initialized to 1. This n denotes a pointer of the bit of a code to be decoded. In this case, n=1 corresponds to the leftmost bit of the code.

At operation SD3, when the surrounding of the input image coded data I4 includes image data (for example, blank space), the image cut-out section 201 cuts out the effective image coded data I4 from the total.

At operation SD4, the block dividing section 202 divides the image coded data I4 cut out by the image cut-out section 201 into M×N blocks based on the block divide processing, and outputs the result as the image data divided into blocks to the block extracting section 203.

At operation SD5, the block extracting section 203 extracts a pair of blocks (two blocks) corresponding to n=1 from the image data divided into blocks, and outputs the density distributions of these blocks as the block density data to the averaging section 204.

At operation SD6, the averaging section 204 obtains left-side average density data corresponding to one of the blocks and right-side average density data corresponding to the other block from the block density data by the average processing.

At operation SD7, the averaging section 204 stores the left-side average density data into a register $205_l$ and stores the right-side average density data into a register $205_r$ respectively.

At operation SD8, the comparing section 401 compares a magnitude relation between the left-side average density data and the right-side average density data stored in the register $205_l$ and the register $205_r$ respectively, thereby making a bit decision. The comparing section 401 outputs the result of the bit decision (bit decided as "0" or "1" from the expression described above), to the decoding section 402.

The comparing section 401 obtains a difference between the left-side average density data and the right-side average density data. When the difference of densities is larger than the upper threshold explained at operation SA14 (refer to FIG. 6), the comparing section 401 sets the result of the bit decision to "2" (uncertain: refer to FIG. 15) by regarding that the bit decision result corresponding to the pair of blocks is not reliable.

At operation SD9, the comparing section 401 increments n by 1. As a result, n becomes 2. At operation SD10, the comparing section 401 decides whether n is larger than nend (=15), and in this case, sets "No" as a result of the decision made, in a similar manner to that at operation SC10 (refer to FIG. 11).

Thereafter, the operation at operation SD5 and after is repeated until when the result of the decision made at operation SD10 becomes "Yes".

When n becomes 17 at operation SD9, the result of the decision made at operation SD10 is set to "Yes". At this point of time, the comparing section 401 sets the candidate code for error-correction-coding $CE_1$ illustrated in FIG. 15 as a result of the bit decision.

At operation SD11, the comparing section 401 decides whether the processing concerning the last pair of blocks (two blocks) in the image data divided into blocks ends, and, in this case, sets "No" as a result of the decision made.

At operation SD16, the comparing section 401 sets n to 1 in order to reset n (=16). At operation SD5, the block extracting section 203 extracts the next pair of blocks (two blocks) corresponding to n=1 from the image data divided into blocks. Then, the block extracting section 203 outputs the density distributions of the blocks as the block density data to the averaging section 204.

Thereafter, the above operation is repeated until when the result of the decision made at operation SD11 becomes "Yes".

Figure 11:
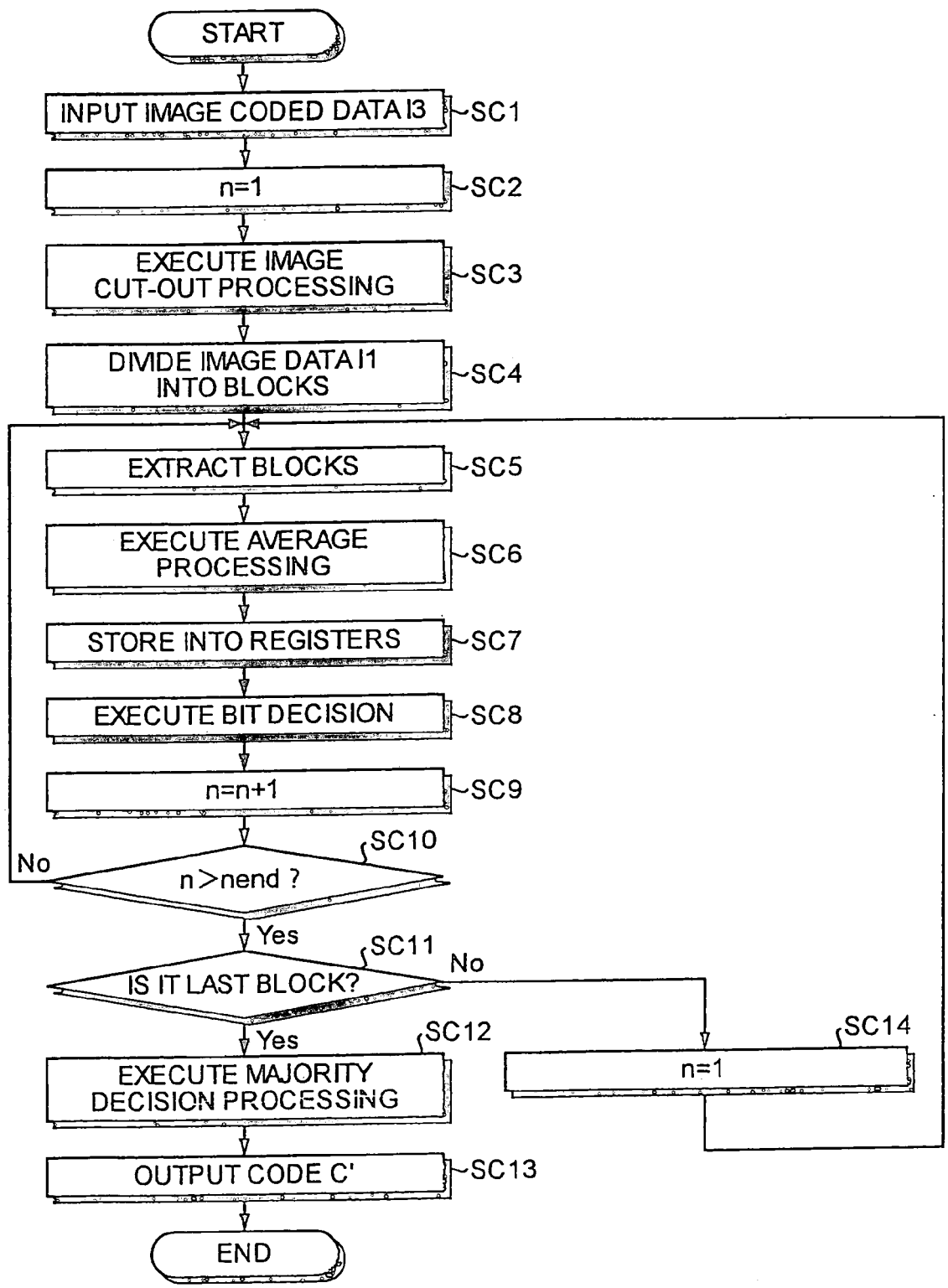
FIG. 11 is a flowchart of operations performed by the decoder 200.

When the result of the decision made at operation SD11 becomes "Yes", at operation SD12, the decoding section 402 executes a majority decision processing, in a similar manner to that at operation SC12 (refer to FIG. 11). In other words, at this point of time, the candidate error-correction-coding codes $CE_1$ to $CE_8$ illustrated in FIG. 15 are the result of the bit decision.

The decoding section 402 makes each bit (15 bits in total) firm based on a majority decision in a bit unit (a bit string in a vertical direction in the drawing) from the candidate error-correction-coding codes $CE_1$ to $CE_8$. As a result, the error-correction-coding code CE' is generated.

For example, in the case of the leftmost bit of the candidate error-correction-coding code $CE_1$ to $CE_8$ "0" is 2, "1" is 5, and "2" is 1. Therefore, the leftmost bit of the error-correction-codes CE' is decided as "1" based on the majority decision.

At operation SD13, the decoding section 402 executes a supplement processing to replace the bit of "2" (uncertain) in the candidate error-correction-coding codes $CE_1$ to $CE_8$ (i.e., the candidate error-correction-coding code group CEG) with a corresponding bit in the error-correction-coding code CE', and obtains the candidate error-correction-coding code group CEG' (i.e., the candidate error-correction-coding codes $CE'_1$ to $CE'_8$).

At operation SD14, the decoding section 402 executes the error correction decode processing (for example, a decode processing based on the BCH code) for each of the candidate error-correction-coding codes $CE'_1$ to $CE'_8$, and obtains a code (corresponding to the code Ca illustrated in FIG. 12) and number of errors.

At operation SD15, the decoding section 402 outputs a code corresponding to a minimum number of errors among codes obtained by the error correction decode processing, as the code Ca'.

As explained above, according to the second embodiment, the error-correction-coding code CE is embedded into a plurality of blocks as explained with reference to FIG. 12. Therefore, the decoder 400 and the like can correct errors, and can increase reliability.

Third Embodiment

In the first and the second embodiments, the configuration example of encoding and decoding using the average density of the total block (for example, the block $B_{i18}$) as illustrated in FIG. 3 is explained. It is also possible to have a configuration that uses the average density of only some portion (for example, the center portion) of the blocks. This configuration example is explained below as a third embodiment of the present invention.

Figure 16:
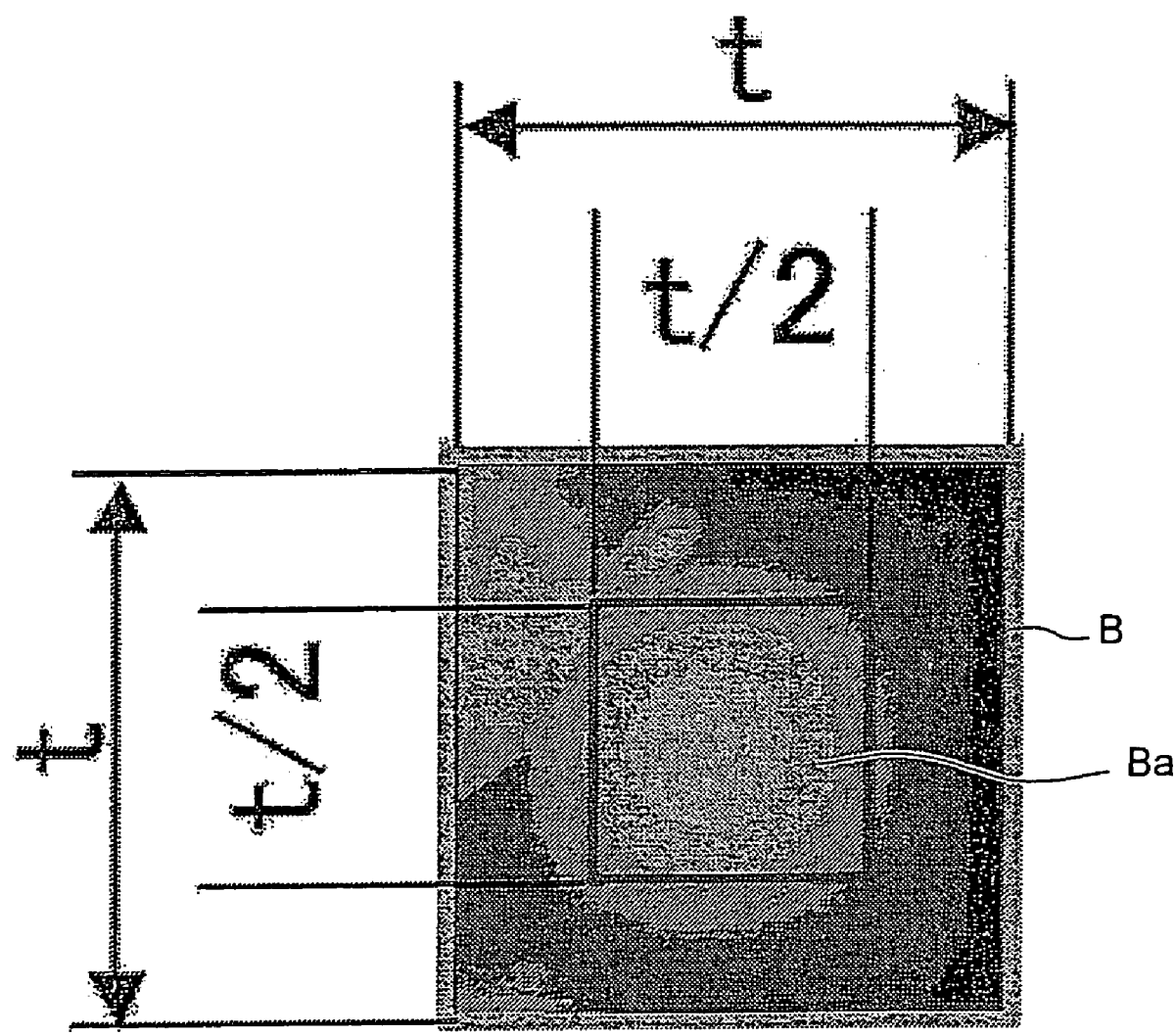
FIG. 16 is to explain a third embodiment of the present invention.

FIG. 16 is to explain the third embodiment. In this drawing, a block B corresponds to the block (for example, the block $B_{i18}$ illustrated in FIG. 3) in the first and the second embodiments, and has a size of t×t pixels. In the third embodiment, encoding and decoding are carried out using the average density of a center portion Ba ((t/2)×(t/2) pixel size) as one portion of the block B.

As explained above, according to the third embodiment, the processing quantity concerning the density change processing can be reduced from that when the average density of the total block is used.

Fourth Embodiment

When the first to the third embodiments described above are applied to a color image, the following two methods may be employed. One method is to embed a code into a gray scale image (a monochromatic image) that is obtained by transforming a color image into brightness. The other method is to embed a code into any one component (for example, a yellow color component) out of color components (a cyan component, a magenta component, and a yellow component) of three primary colors (cyan, magenta, and yellow) in a color image.

Figure 18:
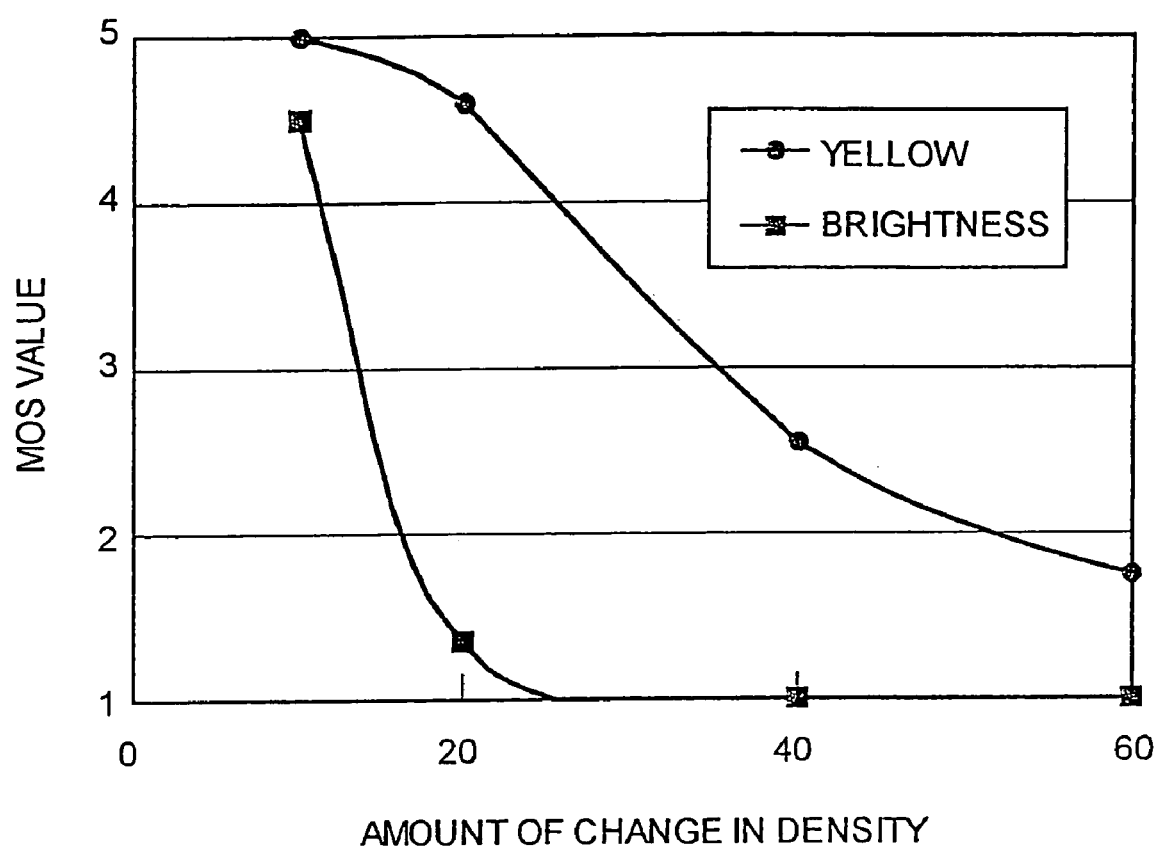
FIG. 18 is a graph that illustrates a relation between the density change quantity and the MOS value according to the fourth embodiment.

The latter method has an advantage over the former method in that a change in the density is not easily discriminated by human eyes (refer to FIG. 18). FIG. 18 is a graph that expresses a relation between a density change quantity and MOS (Mean Opinion Score) according to the fourth embodiment.

This graph is the result of evaluation according to a subjective evaluation method that is prescribed in the International Commission on Illumination (ITU-T) known as an image evaluation method. According to the subjective evaluation method, when it is not possible to visually discriminate between an original image and an image obtained by changing the image by only a density change, five points are scored for the MOS value. When a difference between the two images becomes larger, a lower score is evaluated for the MOS value.

In the graph, "yellow" is the result of evaluation concerning an image of the yellow component. The "brightness" is the result of evaluation concerning an image of gray scale. As is clear from this graph, the yellow component ("yellow") has a higher MOS value than that of the gray scale ("brightness") even when the density change quantity increases. Therefore, according to the latter method of changing the density in the yellow component, a change cannot be easily discriminated by human eyes.

A configuration example of embedding a code into a color component (in this case, the yellow component) is explained as a fourth embodiment according to the present invention.

Figure 17:
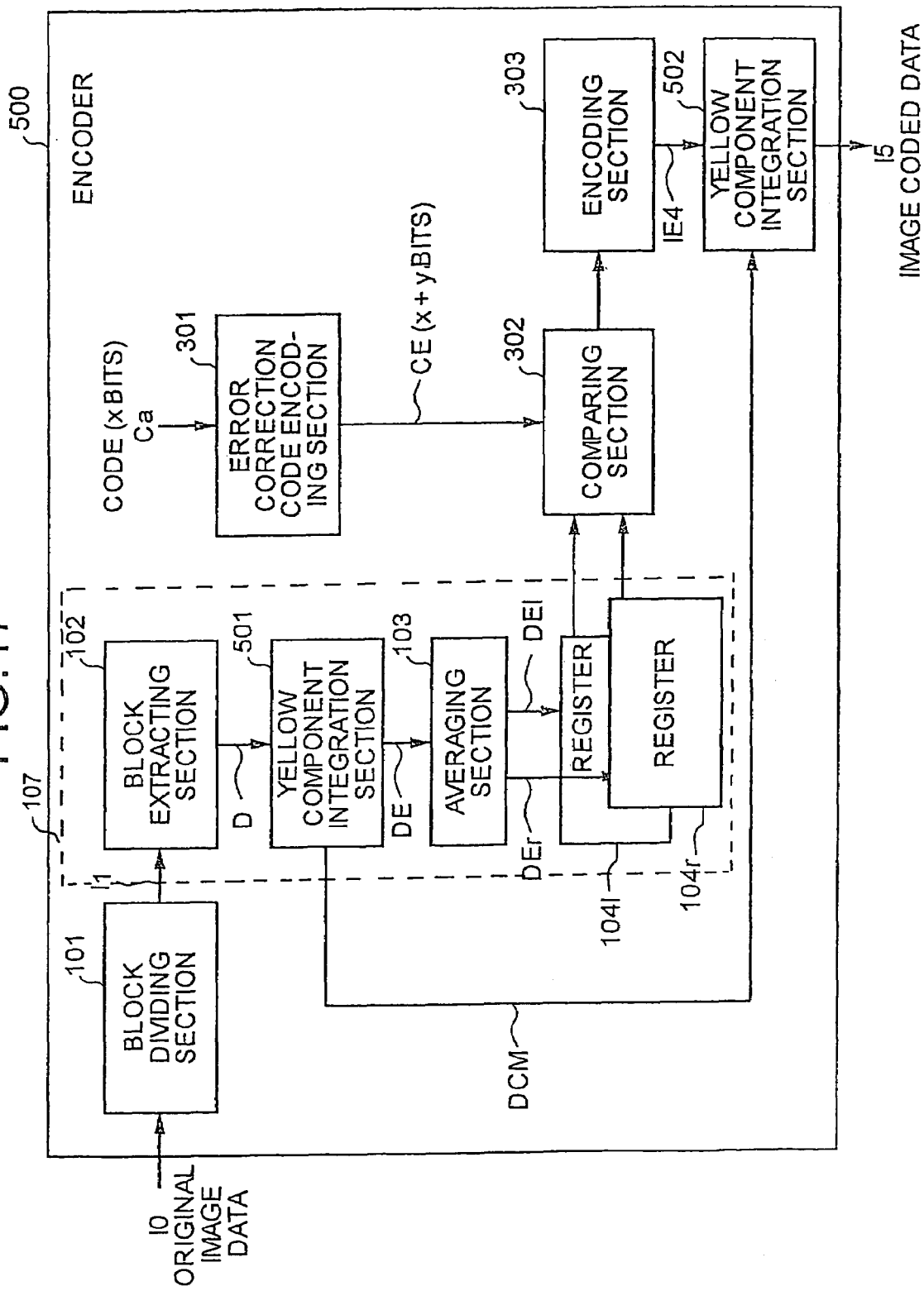
FIG. 17 is a block diagram of an encoder 500 according to a fourth embodiment of the present invention.

FIG. 17 is a block diagram of an encoder 500 according to the fourth embodiment. In this drawing, portions corresponding to those in FIG. 12 are designated with like reference numerals, and their explanation is omitted.

In FIG. 17, a yellow component cut-out section 501 and a yellow component integration section 502 are newly provided. The yellow component cut-out section 501 cuts out the yellow component from block density data D, and outputs this component as yellow block density data DE to the averaging section 103.

The yellow component cut-out section 501 obtains left-side average density data $DE_l$ corresponding to one block and right-side average density data $DE_r$ corresponding to the other block from the yellow block density data DE, and stores these data into the register $104_l$ and the register $104_r$, respectively.

The yellow component cut-out section 501 also cuts out the cyan component and the magenta component from the block density data D, and outputs these components as cyan/magenta block density data DCM to the yellow component integration section 502.

In the fourth embodiment, a processing is executed to the yellow block density data DE, and the density of the yellow component is changed. The encoding section 303 outputs yellow image coded data IE4 corresponding to the yellow component. The yellow component integration section 502 integrates the yellow image coded data IE4 and the cyan/magenta block density data DCM, and outputs the result as image coded data I5.

As explained above, according to the fourth embodiment, the yellow component cut-out section 501 cuts out the yellow component, and embeds into a plurality of blocks of the yellow component. Therefore, by utilizing the characteristic amount that yellow is not distinctive, the data decision capacity can be maintained without degrading the image quality.

Fifth Embodiment

Figure 19:
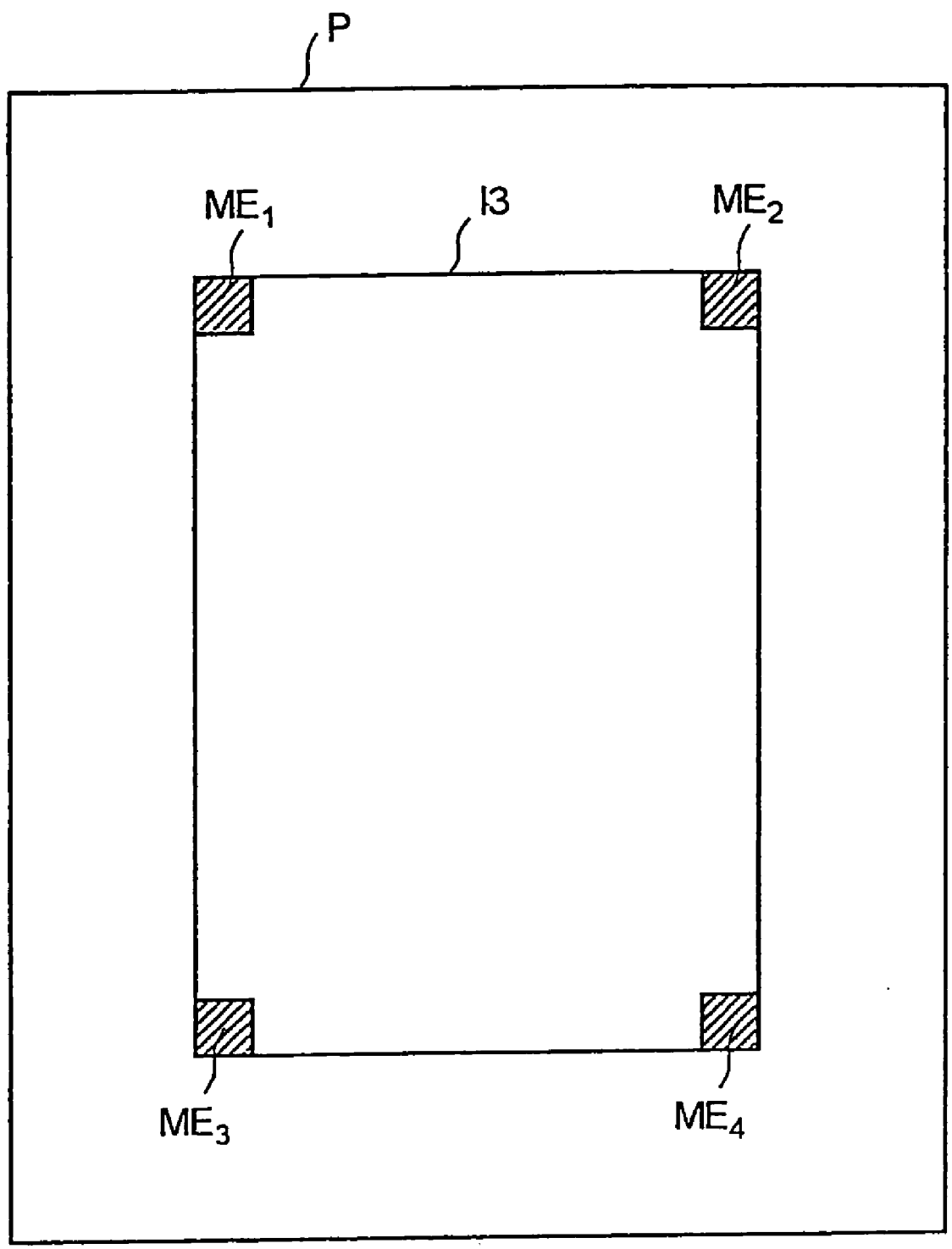
FIG. 19 explains about the image cut-out processing according to the fifth embodiment of the present invention.

A fifth embodiment of the present invention relates to how the image cut-out section 201 illustrated in FIG. 9 cuts-out the image. As illustrated in FIG. 19, the encoder 100 (refer to FIG. 1) may add yellow marks $ME_1$ to $ME_4$ at four corners of the image coded data I3 to distinguish between the cut-out portion and a blank portion P. This configuration example is explained below as the fifth embodiment.

In FIG. 19, the yellow marks $ME_1$ to $ME_4$ are yellow fine dots, and are not distinctive as explained with reference to FIG. 18.

Next, how the image cut-out section 201 illustrated in FIG. 9 cuts the image is explained. When the blank portion P and the image coded data I3 (the yellow marks $ME_1$ to $ME_4$) illustrated in FIG. 19 are input to the image cut-out section 201, a four-corner search processing illustrated in FIG. 21 is executed.

In this four-corner search processing, the four corners of the image coded data I3 (the yellow marks $ME_1$ to $ME_4$) illustrated in FIG. 19 are searched. In the following explanation, number of pixels of the blank portion P (white) is assumed as 255, and number of pixels of black (yellow) is assumed as 0.

Figure 20:
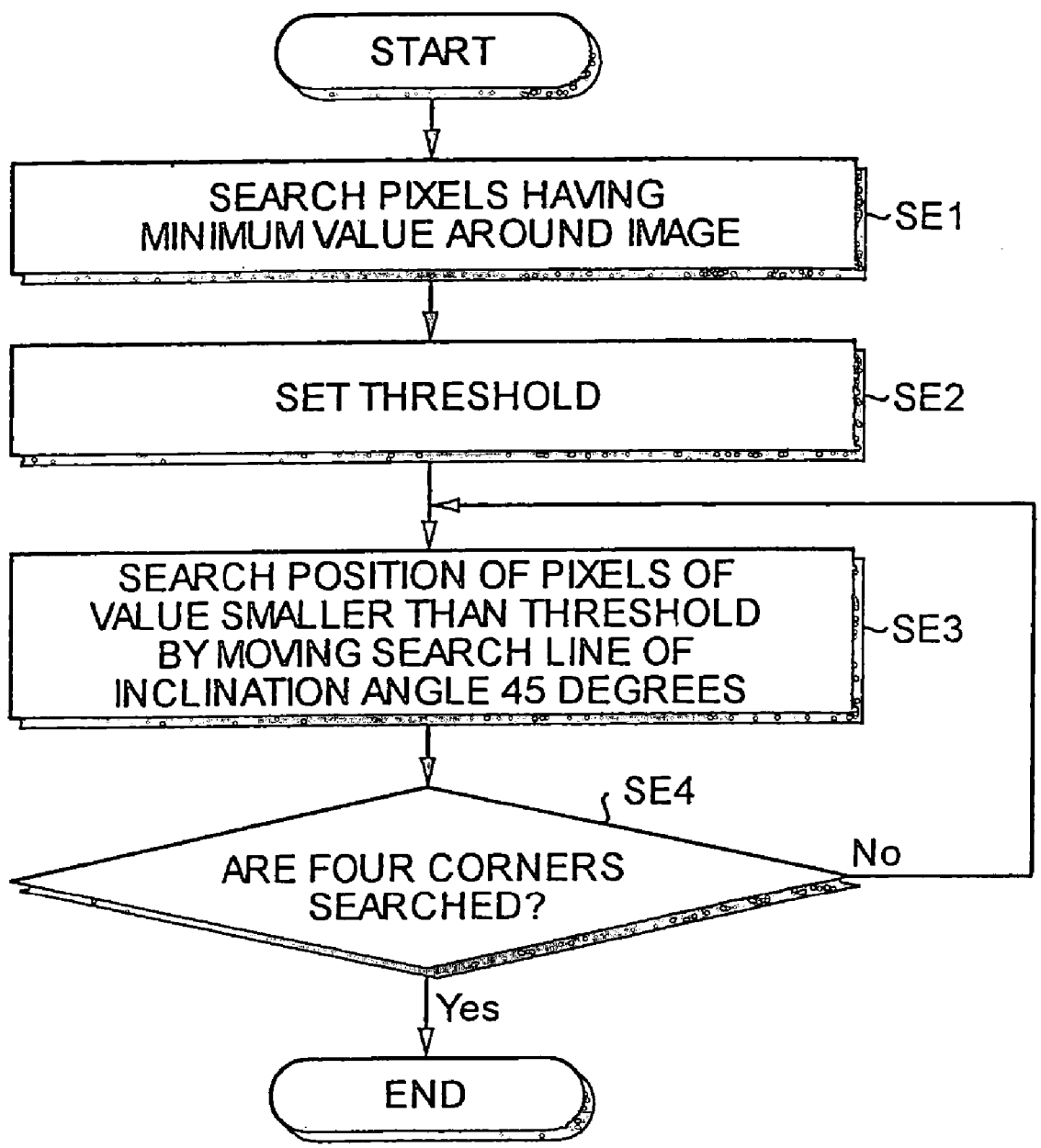
FIG. 20 is a flowchart of a four-corner search processing according to the fifth embodiment.

Specifically, at operation SE1 illustrated in FIG. 20, the image cut-out section 201 searches a minimum pixel value (for example, 250) in the blank portion P (white) that is the surrounding portion of the image coded data I3. At operation SE2, the image cut-out section 201 multiplies a safety ratio (0.9) to the minimum pixel value (250), thereby setting a threshold (225).

Figure 21:
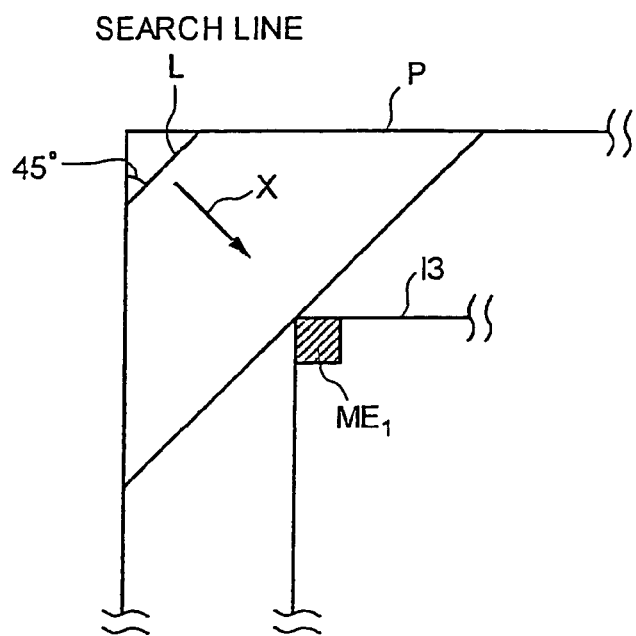
FIG. 21 explains about the four-corner search processing according to the fifth embodiment.

At operation SE3, the image cut-out section 201 searches a position of pixels equal to or smaller than the threshold (255) by moving a search line L of an inclination angle 45 degrees from a corner of the blank portion P (the left upper corner in FIG. 21) to an X direction, as illustrated in FIG. 21.

When the search line L reaches the yellow mark $ME_1$, the image cut-out section 201 firms the position of the yellow mark $ME_1$ as one of the four corners of the image coded data I3, as the pixel value (=0) of the yellow mark $ME_1$ is smaller than the threshold.

At operation SE4, the image cut-out section 201 decides whether the four corners of the image coded data I3 are searched, and, in this case, sets "No" as a result of the decision made. Thereafter, the processing at operation SE3 is executed for the other three corners. When the four corners (the yellow marks $ME_1$ to $ME_4$) illustrated in FIG. 19 are searched, the image cut-out section 201 sets "Yes" as a result of the decision made at operation SE4.

Next, the image cut-out section 201 cuts out the image coded data I3 from the total image (i.e., the blank portion P and the image coded data I3) illustrated in FIG. 19 according to a known affine transformation or the like using the position coordinates of the yellow marks $ME_1$ to $ME_4$.

As explained above, according to the fifth embodiment, the yellow marks $ME_1$ to $ME_4$ for cut-out are given to the image coded data I3 as the embedded result as illustrated in FIG. 19. Therefore, the image cut-out at the decoding time can be executed easily.

While the configurations according to the first to the fifth embodiments of the present invention are explained in detail with reference to the drawings, detailed configuration examples are not limited to the first to the fifth embodiments. In the present invention, any design alteration within a scope not departing from the gist of the invention is included.

Figure 22:
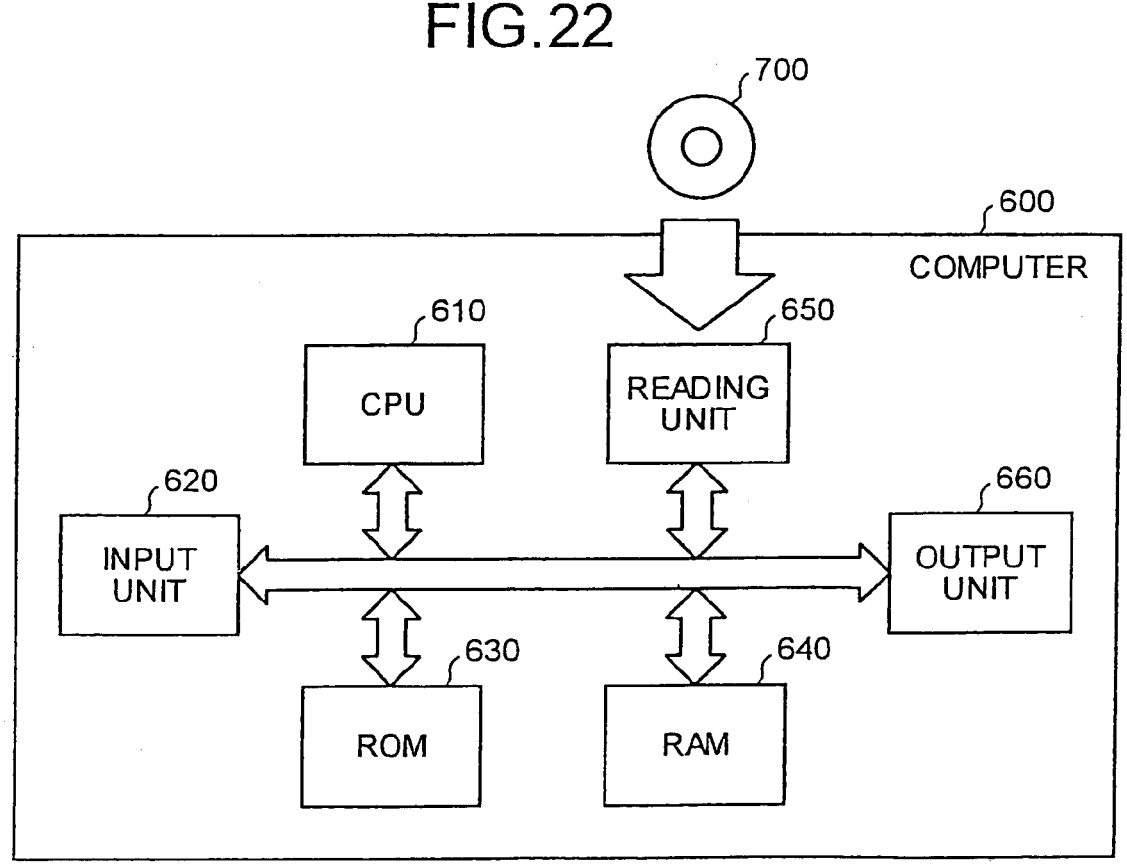
FIG. 22 is a block diagram of a computer as a modification according to the first to the fifth embodiments of the present invention.

For example, in the first to the fifth embodiments, a computer program that achieves the functions of the encoder 100, the decoder 200, the encoder 300, the decoder 400, or the encoder 500 may be recorded onto a computer-readable recording medium 700 illustrated in FIG. 22. A computer 600 illustrated in FIG. 22 reads the computer program recorded on the recording medium 700, and executes the computer program, thereby achieving the functions.

The computer illustrated in this drawing includes a CPU (Central Processing Unit) 610 that achieves the computer program, an input unit 620 including a keyboard and a mouse, a ROM (Read Only Memory) 630 that stores various data, a RAM (Random Access Memory) 640 that stores operation parameters, a reading unit 650 that reads the computer program from the recording medium 700, and an output unit 660 including a display and a printer.

The CPU 610 reads the computer program that is recorded on the recording medium 700 via the reading unit 650, and executes the computer program, thereby achieving the functions. The recording medium 700 includes an optical disk, a flexible disk, a hard disk, etc.

The characteristic amount of the image is not limited to the average density. It is also possible to use other characteristic amount that are obtained from granularity, chroma, density barycenter, and variance. In this case, as the characteristic amount is granularity, chroma, density barycenter, or variance, the characteristic amount is not distinctive, which can reduce the influence to the image quality.

In the first to the fifth embodiments, the characteristic amount may be changed to other characteristic amount based on a predetermined conversion rule.

Effects due to the Invention

As explained above, according to the present invention, one code is related to each pair of blocks in a plurality of blocks as a result of dividing image data, based on a magnitude relation of characteristic amount, and a plurality of codes are embedded into a plurality of blocks. Therefore, there is an effect that the conventional FFT is not necessary, and that the processing required to embed the code into the image data can be reduced.

According to the present invention, when the magnitude relation of characteristic amount between the pair of blocks does not coincide with the code to be embedded, the characteristic amount of the pair of blocks are changed to reverse the magnitude relation. Therefore, there is an effect that a desired code can be freely embedded.

According to the present invention, when a difference of characteristic amount between a pair of blocks exceeds an upper threshold, the characteristic amount are not changed. Therefore, there is an effect that it is possible to prevent the image quality from being degraded following an excessive change of the average density.

According to the present invention, when the magnitude relation of characteristic amount coincides with the code to be embedded and also when the difference of densities between the pair of blocks is less than a lower threshold, the characteristic amount are changed such that the difference becomes equal to or higher than the lower threshold. Therefore, there is an effect that when the code is decoded, a reduction in the precision such as a reversal of the magnitude relation can be prevented.

According to the present invention, as a plurality of codes for error-correction-coding are embedded into a plurality of blocks, there is an effect that the decoding side can correct an error, and reliability can be increased.

According to the present invention, as each characteristic amount is extracted from a portion of each block, there is an effect that the processing quantity can be reduced as compared with when the characteristic amount of a total block is used.

According to the present invention, a yellow component is cut out from a plurality of blocks, and embedding is executed into a plurality of blocks of the yellow component. Therefore, there is an effect that by utilizing the characteristic amount that yellow is not distinctive, the data decision capacity can be maintained without degrading the image quality.

According to the present invention, there is an effect that the processing required to decode a code of the image data can be reduced.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An image-data processing apparatus for embedding a code into image data, said image-data processing apparatus comprising:
    a dividing unit that divides the image data into a plurality of blocks;
    a characteristic-amount extracting unit that extracts a characteristic amount of each of the blocks; and
    an encoding unit that generates image data into which a code is embedded based on a magnitude relation between characteristic amounts of each pair of two blocks extracted by said characteristic-amount extracting unit, wherein
    said encoding unit decides whether the magnitude relation between characteristic amounts of the pair of blocks coincides with a code to be embedded,
    if the magnitude relation between the characteristic amounts of the pair of blocks coincides with the code to be embedded, then said encoding unit maintains the magnitude relation between the characteristic amounts of the pair of blocks extracted by said characteristic amount extracting unit, and
    if the magnitude relation between the characteristic amounts of the pair of blocks does not coincide with the code to be embedded, then said encoding unit calculates an average of the characteristic amounts of the pair of blocks, calculates respective new characteristic amounts for the pair of blocks by calculating a new characteristic amount for a block having a smaller characteristic amount in the pair of blocks by adding a predetermined value to the average and calculating a new characteristic amount for a block having a larger characteristic amount in the pair of blocks by subtracting a predetermined value from the average, and generates the image data in which the characteristic amount of each block in the pair of blocks is changed to the respective calculated new characteristic amounts.

2. The image-data processing apparatus according to claim 1, wherein if the magnitude relation between the characteristic amounts of the pair of blocks does not coincide with the code to be embedded, and if a difference between the characteristic amounts is larger than an upper threshold, then said encoding unit does not change the characteristic amounts.

3. The image-data processing apparatus according to claim 1, wherein if the magnitude relation between the characteristic amounts of the pair of blocks coincides with the code to be embedded, and if a difference between the characteristic amounts is smaller than a lower threshold, then said encoding unit changes the characteristic amounts in such a manner that the difference becomes equal to or larger than the lower threshold.

4. The image-data processing apparatus according to claim 1, further comprising:
    an error-correction-code generating unit that encodes the code to be embedded using error correction coding, to generate an error correction code,
    wherein said encoding unit generates image data in which a plurality of error correction nodes are embedded by associating the code based on the magnitude relation between the characteristic amounts of the pair of blocks with the error correction code generated by said error-correction-code generating unit.

5. The image-data processing apparatus according to claim 1, wherein the pair of blocks is formed with two adjacent blocks.

6. The image-data processing apparatus according to claim 1, wherein said characteristic-amount extracting unit extracts the characteristic amount from a portion of each of the blocks.

7. The image-data processing apparatus according to claim 1, wherein:
said characteristic-amount extracting unit extracts the characteristic amount related to a specific color,
said encoding unit decides whether the magnitude relation between the specific color related characteristic amounts of the pair of blocks coincides with the code to be embedded.
if the magnitude relation between the specific color related characteristic amounts of the pair of blocks coincides with the code to be embedded, then said encoding unit maintains the magnitude relation between the specific color related characteristic amounts, and
if the magnitude relation between the specific color related characteristic amounts of the pair of blocks does not coincide with the code to be embedded, then said encoding unit calculates an average of the specific color related characteristic amounts of the pair of blocks calculates respective new characteristic amounts for the pair of blocks by calculating a new characteristic amount for a block having a smaller specific color related characteristic amount in the pair of blocks by adding a predetermined value to the average and calculating a new characteristic amount for a block having a larger specific color related characteristic amount in the pair of blocks by subtracting a predetermined value from the average, and generates the image data in which the specific color related characteristic amount of each block in the pair of blocks is changed to the respective calculated new characteristic amounts.

8. The image-data processing apparatus according to claim 7, wherein:
said characteristic-amount extracting unit extracts the characteristic amount for a yellow component, and
said encoding unit embeds the code based on a magnitude relation between characteristic amounts for the yellow component.

9. The image-data processing apparatus according to claim 1, wherein said encoding unit adds a cut-out mark pixel in the image data in which the code is embedded.

10. The image-data processing apparatus according to claim 1, wherein said characteristic amount includes at least one of average density, granularity, chroma, density barycenter, and variance.

11. The image-data processing apparatus according to claim 1, wherein said encoding unit repeatedly embeds a plurality of codes into the image data.

12. An image-data processing method of embedding a code into image data, said image-data processing method comprising:
dividing the image data into a plurality of blocks;
extracting a characteristic amount of each of the blocks; and
encoding including generating image data into which a code is embedded based on a magnitude relation between characteristic amounts of each pair of two blocks extracted at said extracting,
wherein said encoding includes
deciding whether the magnitude relation between characteristic amounts of the pair of blocks coincides with a code to be embedded,
maintaining, if the magnitude relation between the characteristic amounts of the pair of blocks coincides with the code to be embedded, the magnitude between the characteristic amounts extracted at said extracting,
if the magnitude relation between the characteristic amounts of the pair of blocks does not coincide with the code to be embedded,
calculating an average of the characteristic amounts of the pair of blocks,
calculating respective new characteristic amounts for the pair of blocks by calculating a new characteristic amount for a block having a smaller characteristic amount in the pair of blocks by adding a predetermined value to the average and calculating a new characteristic amount for a block having a larger characteristic amount in the pair of blocks by subtracting a predetermined value from the average, and
generating the image data in which the characteristic amount of each block in the pair of blocks is changed to the respective calculated new characteristic amounts.

13. The image-data processing method according to claim 12, wherein if the magnitude relation between the characteristic amounts of the pair of blocks does not coincide with the code to be embedded, and if a difference between the characteristic amounts is larger than an upper threshold, the encoding includes not changing the characteristic amounts.

14. The image-data processing method according to claim 12, wherein if the magnitude relation between the characteristic amounts of the pair of blocks coincides with the code to be embedded, arid if a difference between the characteristic amounts is smaller than a lower threshold, the encoding includes changing the characteristic amounts in such a manner that the difference becomes equal to or larger than the lower threshold.

15. The image-data processing method according to claim 12, further comprising generating an error correction code by encoding the code to be embedded using error correction coding,
wherein said encoding includes generating image data in which a plurality of error correction codes are embedded by associating the code based on the magnitude relation between the characteristic amounts of the pair of blocks with the error correction code generated at said generating.

16. The image-data processing method according to claim 12, wherein the pair of blocks is formed with two adjacent blocks.

17. The image-data processing method according to claim 12, wherein said extracting includes extracting the characteristic amount from a portion of each of the blocks.

18. The image-data processing method according to claim 12, wherein:
said extracting includes extracting the characteristic amount related to a specific color, and
said encoding includes
deciding whether the magnitude relation between the specific color related characteristic amounts of the pair of blocks coincides with the code to be embedded.

maintaining, if the magnitude relation between the specific color related characteristic amounts of the pair of blocks coincides with the code to be embedded, the magnitude relation between the specific color related characteristic amounts, and if the magnitude relation between the specific color related characteristic amounts of the pair of blocks does not coincide with the code to be embedded, calculating an average of the specific color related characteristic amounts of the pair of blocks, calculating respective new characteristic amounts for the pair of block by calculating a new characteristic amount for a block having a smaller specific color related characteristic amount in the pair of blocks by adding a predetermined value to the average and calculating a new characteristic amount for a block having a larger specific color related characteristic amount in the pair of blocks by subtracting a predetermined value from the average, and generating the image data in which the specific color related characteristic amount of each block in the pair of blocks is changed to the respective calculated new characteristic amounts.

19. The image-data processing method according to claim 18, wherein:

said extracting includes extracting the characteristic amount for a yellow component, and said encoding includes embedding the code based on a magnitude relation between characteristic amounts for the yellow component.

20. The image-data processing method according to claim 12, wherein said encoding includes adding a cut-out mark pixel in the image data in which the code is embedded.

21. The image-data processing method according to claim 12, wherein said characteristic amount includes at least one of average density, granularity, chroma, density barycenter, and variance.

22. The image-data processing method according to claim 12, wherein said encoding includes repeatedly embedding a plurality of codes into the image data.

23. A computer readable medium storing an image data processing program for embedding a code into image data by controlling an apparatus to perform operations comprising:

dividing the image date into a plurality of blocks;

extracting a characteristic amount of each of the blocks; and encoding including generating image data into which a code is embedded based on a magnitude relation between characteristic amounts of each pair of two blocks extracted by said characteristic-amount extracting, wherein said encoding further includes:

deciding whether the magnitude relation between characteristic amounts of the pair of blocks coincides with a code to be embedded, if the magnitude relation between the characteristic amounts of the pair of blocks coincides with the code to be embedded, maintaining the magnitude relation between the characteristic amounts extracted, and if the magnitude relation between the characteristic amounts of the pair of blocks does not coincide with the code to be embedded, calculating an average of the characteristic amounts of the pair of blocks, calculating respective new characteristic amounts for the pair of blocks by calculating a new characteristic amount for a block having a smaller characteristic amount in the pair of blocks by adding a predetermined value to the average and calculating a new characteristic amount for a block having a larger characteristic amount in the pair of blocks by subtracting a predetermined value from the average, and generating the image data in which the characteristic amount of each block in the pair of blocks is changed to the respective calculated new characteristic amounts.

24. The computer readable medium according to claim 23, wherein if the magnitude relation between the characteristic amounts of the pair of blocks does not coincide with the code to be embedded, and if a difference between the characteristic amounts is larger then an upper threshold, the encoding does not change the characteristic amounts.

25. The computer readable medium according to claim 23, wherein if the magnitude relation between the characteristic amounts of the pair of blocks coincides with the code to be embedded, and if a difference between the characteristic amounts is smaller than a lower threshold, the encoding changes the characteristic amounts in such a manner that the difference becomes equal to or larger than the lower threshold.

26. The computer readable medium according to claim 23, wherein the operations further comprise encoding the code to be embedded using error correction coding to generate an error correction code, wherein said encoding generates image data in which a plurality of error correction codes are embedded by associating the code based on the magnitude relation between the characteristic amounts of the pair of blocks with the generated error correction code.

27. The computer readable medium according to claim 23, wherein the pair of blocks is formed with two adjacent blocks.

28. The computer readable medium according to claim 23, wherein said extracting extracts the characteristic amount from a portion of each of the blocks.

29. The computer readable medium according to claim 23, wherein:

said extracting extracts the characteristic amount related to a specific color, and said encoding includes:

deciding whether the magnitude relation between the specific color related characteristic amounts of the pair of blocks coincides with the code to be embedded, if the magnitude relation between the specific color related characteristic amounts of the pair of blocks coincides with the code to be embedded, said encoding maintains the magnitude relation between the specific color related characteristic amounts, and if the magnitude relation between the specific color related characteristic amounts of the pair of blocks does not coincide with the code to be embedded, said encoding calculates an average of the specific color related characteristic amounts of the pair of blocks, calculates respective new characteristic amounts for the pair of blocks by calculating a new characteristic amount for a block having a smaller specific color related characteristic amount in the pair of blocks by adding a predetermined value to the average and calculating a new characteristic amount for a block having a larger specific color related characteristic amount in the pair of blocks by subtracting a predetermined value from the average, and generates the image data in which the specific color related characteristic amount of each block in the pair of blocks is changed to the respective calculated new characteristic amounts.

30. The computer readable medium according to claim 29, wherein
said extracting extracts the characteristic amount for a yellow component, and
said encoding embeds the code based on a magnitude relation between characteristic amounts for the yellow component.

31. The computer readable medium according to claim 23 wherein said encoding adds a cut-out mark pixel in the image data in which the code is embedded.

32. The computer readable medium according to claim 23, wherein said characteristic amount includes at least one of average density, granularity, chroma, density barycenter, and variance.

33. The computer readable medium according to claim 23, wherein said encoding repeatedly embeds a plurality of codes into the image data.

34. An image-data processing system for embedding a coda into image data and extracting a code embedded in image data, said image-data processing system comprising:
an image-data encoding device that includes:
a dividing unit that divides the image data into a plurality of blocks,
a characteristic-amount extracting unit that extracts a characteristic amount of each of the blocks, and
an encoding unit that generates image data into which a code is embedded based on a magnitude relation between characteristic amounts of each pair of two blocks extracted by said characteristic-amount extracting unit, wherein
said encoding unit decides whether the magnitude relation between characteristic amounts of the pair of blocks coincides with a code to be embedded,
if the magnitude relation between the characteristic amounts of the pair of blocks coincides with the code to be embedded, then said encoding unit maintains the magnitude relation between the characteristic amounts of the pair of blocks extracted by said characteristic-amount extracting unit, and
if the magnitude relation between the characteristic amounts of the pair of blocks does not coincide with the code to be embedded, then said encoding unit calculates an average of the characteristic amounts of the pair of blocks, calculates respective new characteristic amounts for the pair of blocks by calculating a new characteristic amount for a block having a smaller characteristic amount in the pair of blocks by adding a predetermined value to the average and calculating a new characteristic amount for a block having a larger characteristic amount in the pair of blocks by subtracting a predetermined value from the average, and generates the image data in which the characteristic amount of each block in the pair of blocks is changed to the respective calculated new characteristic amounts; and
an image-data decoding device that includes:
a dividing unit that divides the image data into a plurality of blocks,
a characteristic-amount extracting unit that extracts a characteristic amount of each of the blocks, and
a decoding unit that extracts a code from a pair of blocks based on a magnitude relation between the characteristic amounts of the pair of blocks.

* * * * *

UNITED STATES PATENT AND TRADEMARK OFFICE
CERTIFICATE OF CORRECTION

PATENT NO. : 7,280,701 B2  Page 1 of 1
APPLICATION NO. : 10/824528
DATED : October 9, 2007
INVENTOR(S) : Jun Moroo et al.

It is certified that error appears in the above-identified patent and that said Letters Patent is hereby corrected as shown below:

Column 20, line 27, delete "characteristic amount" and replace with --characteristic-amount--

Column 20, line 65, delete "nodes" and replace with --codes--

Column 21, line 17, delete "embedded." and replace with --embedded,--

Column 21, line 28, insert --,-- after "blocks"

Column 22, line 37, delete "arid" and insert --and--

Column 22, line 65-66, delete "embedded." and insert --embedded,--

Column 23, line 46, delete "date" and replace with --data--

Column 24, line 15, delete "then" and replace with --than--

Column 25, line 12 insert --,-- after "23"

Column 25, line 23, delete "coda" and replace with --code--

Signed and Sealed this

Fifteenth Day of April, 2008

JON W. DUDAS
*Director of the United States Patent and Trademark Office*